United States Patent
Shanbhag et al.

(10) Patent No.: US 12,475,690 B2
(45) Date of Patent: Nov. 18, 2025

(54) SIMULATING PATHOLOGY IMAGES BASED ON ANATOMY DATA

(71) Applicant: GE Precision Healthcare LLC, Wauwatosa, WI (US)

(72) Inventors: Dattesh Dayanand Shanbhag, Karnataka (IN); Chitresh Bhushan, Schenectady, NY (US); Soumya Ghose, Niskayuna, NY (US); Deepa Anand, Karnataka (IN)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 714 days.

(21) Appl. No.: 17/814,746

(22) Filed: Jul. 25, 2022

(65) Prior Publication Data

US 2024/0029415 A1  Jan. 25, 2024

(51) Int. Cl.
| | |
|---|---|
| *G06V 10/774* | (2022.01) |
| *G06N 3/045* | (2023.01) |
| *G06N 3/0464* | (2023.01) |
| *G06N 3/084* | (2023.01) |
| *G06N 3/094* | (2023.01) |
| *G06T 7/00* | (2017.01) |
| *G06T 7/33* | (2017.01) |

(Continued)

(52) U.S. Cl.
CPC ........ *G06V 10/7747* (2022.01); *G06T 7/0014* (2013.01); *G06T 15/08* (2013.01); *G06T 19/20* (2013.01); *G06V 10/7715* (2022.01); *G16H 30/40* (2018.01); *G16H 50/50* (2018.01); *G06T 2207/20081* (2013.01); *G06T 2207/30012* (2013.01); *G06T 2207/30096* (2013.01); *G06T 2210/41* (2013.01); *G06T 2219/2021* (2013.01); *G06V 2201/033* (2022.01)

(58) Field of Classification Search
None
See application file for complete search history.

(56) References Cited

U.S. PATENT DOCUMENTS 11,854,703 B2 * 12/2023 Lau .................. G16H 50/20
2022/0012815 A1 * 1/2022 Kearney ............ G06N 20/20
(Continued)

FOREIGN PATENT DOCUMENTS

| CN | 114007538 B * | 3/2024 | ............ A61B 34/10 |
| EP | 4020401 A1 * | 6/2022 | ........... G06T 19/006 |
| WO | WO-2022119870 A1 * | 6/2022 | ............. G06T 11/00 |

OTHER PUBLICATIONS

Hawes, M. et al., "The transformation of spinal curvature into spinal deformity: pathological processes and Implications for treatment," Scoliosis, vol. 1, No. 3, Mar. 31, 2006, 9 pages.
(Continued)

*Primary Examiner* — Mohammed Rachedine
(74) *Attorney, Agent, or Firm* — McCoy Russell LLP

(57) ABSTRACT

Systems and methods are provided for an image processing system. In an example, a method includes acquiring a pathology dataset, acquiring a reference dataset, generating a deformation field by mapping points of a reference case of the reference dataset to points of a patient image of the pathology dataset, manipulating the deformation field, applying the deformation field to the reference case to generate a simulated pathology image including a simulated deformation pathology, and outputting the simulated pathology image.

20 Claims, 10 Drawing Sheets

(51) Int. Cl.
| | |
|---|---|
| *G06T 15/08* | (2011.01) |
| *G06T 19/20* | (2011.01) |
| *G06V 10/77* | (2022.01) |
| *G06V 10/82* | (2022.01) |
| *G16H 30/40* | (2018.01) |
| *G16H 50/50* | (2018.01) |

(56) References Cited

U.S. PATENT DOCUMENTS

2022/0198720 A1\* 6/2022 Millette ............... G06T 7/70
2022/0292742 A1\* 9/2022 Mailhe ............... G06T 7/11
2022/0328195 A1\* 10/2022 Mihalef ............... G06T 7/70

OTHER PUBLICATIONS

Roth, H. et al., "Anatomy-specific classification of medical images using deep convolutional nets," Proceedings of the 2015 IEEE 12th International Symposium on Biomedical Imaging (ISBI), Apr. 16, 2015, Brooklyn, New York, 5 pages.

Acero, J. et al., "SMOD—Data augmentation based on Statistical Models of Deformation to enhance segmentation in 2D cine cardiac MRI," Proceedings of FIMH 2019: International Conference on Functional Imaging and Modeling of the Heart, Jun. 6, 2019, Bordeaux, France, 10 pages.

Tang, Z. et al., "An Augmentation Strategy for Medical Image Processing Based on Statistical Shape Model and 3D Thin Plate Spline for Deep Learning," IEEE Access, vol. 7, Sep. 12, 2019, 11 pages.

\* cited by examiner

SIMULATING PATHOLOGY IMAGES BASED ON ANATOMY DATA

FIELD

Embodiments of the subject matter disclosed herein relate to medical imaging, and more specifically to simulating pathology images.

BACKGROUND

Radiology is a branch of medicine that uses imaging to view the internal structures of a patient or object without performing an invasive procedure on the patient or object. Examples of such imaging modalities may include x-ray radiography, computed tomography (CT), positron emission tomography (PET), fluoroscopy, ultrasound, and magnetic resonance imaging (MRI). As one example, a CT scan uses the differential transmission of x-rays through a target volume to acquire image data and to construct tomographic images (e.g., three-dimensional representations of the interior of the human body).

Imaging protocols, such as those implemented to scan a patient using CT, PET, MRI, and so on, may include use of a machine learning model, such as a deep neural network (DNN) or other deep learning based-method, to automatically identify anatomical structures of the patient. Using machine learning models for automatic identification of anatomy may assist in patient diagnosis by decreasing a scan time and increasing an accuracy of identified anatomies, compared to manual identification by a user, such as a medical provider. For example, prior to implementation of a machine learning model in an imaging protocol, the machine learning model may be trained to identify a broad range of anatomical embodiments. For example, in some patients, anatomical structures may be deformed due to disease or other pathologies. The machine learning model may be trained to detect an anatomical structure (e.g., a spine) with or without a deformation. For example, the machine learning model may be trained to identify anatomies with and without anatomical deformities, such as organ or bone deformation, or anomalies, such as foreign objects (e.g., metal implants). The machine learning model may be trained using a set of training images which include examples of anatomical deformities and anomalies, as well as non-pathology images. However, availability of images with pathology embodiments may be scarce, and a greater number of images and diversity of anatomical deformities may be desired to sufficiently train the machine learning model.

BRIEF DESCRIPTION

In one aspect, a method comprises includes acquiring a pathology dataset, acquiring a reference dataset, generating a deformation field by mapping points of a reference case of the reference dataset to points of a patient image of the pathology dataset, manipulating the deformation field, applying the deformation field to the reference case to generate a simulated pathology image including a simulated deformation pathology, and outputting the simulated pathology image.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

The present disclosure will be better understood from reading the following description of non-limiting embodiments, with reference to the attached drawings, wherein below.

DETAILED DESCRIPTION

Figure 1:
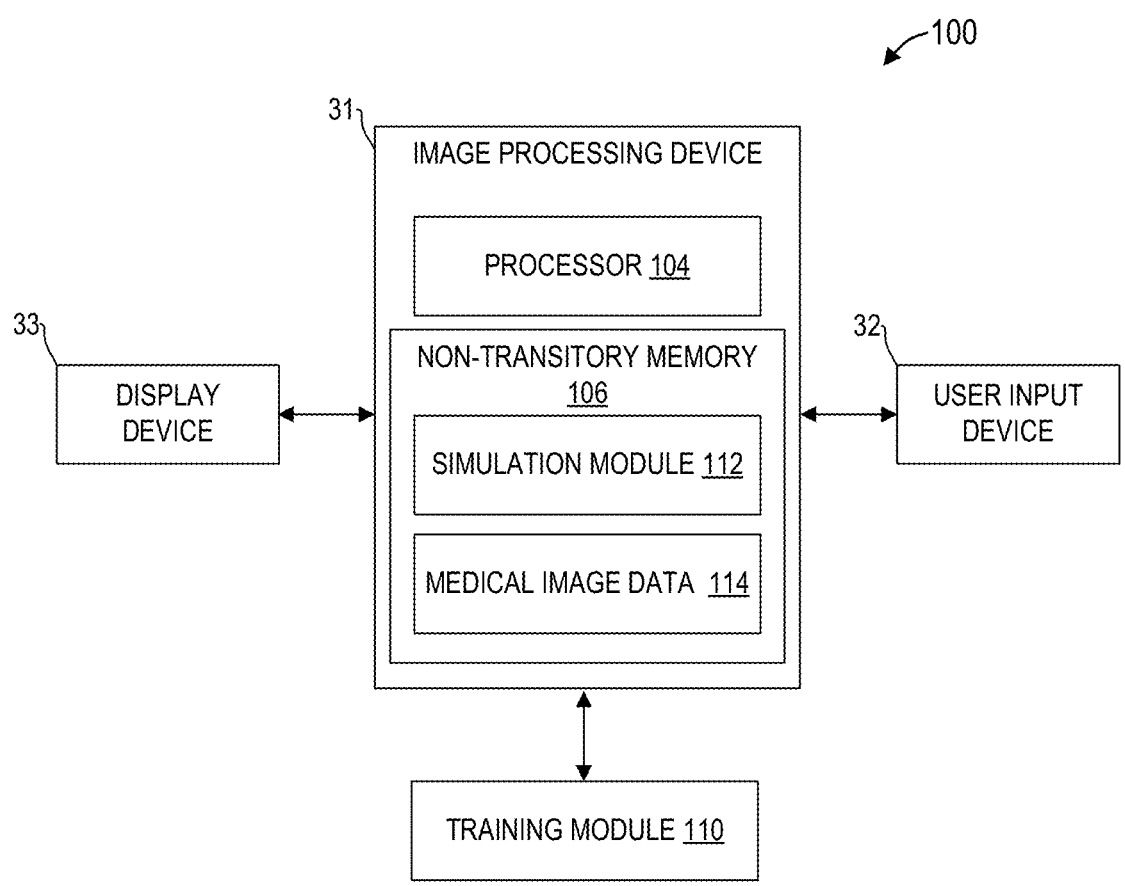
FIG. 1 shows a schematic diagram illustrating an image processing system, according to an embodiment.

Embodiments of the present disclosure will now be described, by way of example, with reference to the FIGS. 1-11, which relate to various embodiments for simulating pathology images. Pathology images may be used to train machine learning models to identify anatomical structures with or without deformities in medical images and therefore assist with patient diagnosis. Performance of machine learning models used for image application is dependent on input data used to train the machine learning models, where paucity of data in training and validation sets may impair performance. Instances where physical deformities arise in patient data may distort anatomical landmarks. For AI-driven applications, such as intelligent plane scanning which is based on using landmarks to place a coverage extent and scan planes, deformities may be considered as part of the training process to train the application to identify a broad range of anatomies which may be present in patient populations (e.g., which may or may not have pathology-associated deformities). However, such datasets are scarce in actual practice and still may not represent all possible pathologies which may arise in patient populations. For example, a patient may have multiple overlapping conditions.

It is common to encounter impaired performances of machine learning models performed on patients having organ deformation in spine and shoulder regions, for example. While organ deformation may be uncommon in patient populations, machine learning models may be more commonly implemented in imaging protocols performed on patients having such conditions, and a level of accuracy may be expected of the machine learning models which is equal to performance of the machine learning models implemented in imaging protocols performed on patients without organ deformation.

With advent of machine learning models for intelligent scan plane planning, including patient data with pathological deformities during training may allow for robust performance of the algorithms in clinical practice. For example, pathological deformities may include kyphosis, scoliosis, vertebrae fracture, Sprengel shoulder, and so on. However, such data may be challenging to produce in actual practice, and limited patient data which is available may not include all degrees of deformities and other patient conditions expected in clinical practice.

Therefore, a method is desired which allows robust training for machine learning models, such as deep learning based methods, which may allow the machine learning models to perform with similar accuracy on patients having less common pathology, such as organ deformation, compared to patients without pathological deformities. The methodology may allow such deformities to be obtained from a normal dataset using a small set of imaging data which include deformities.

According to embodiments disclosed herein, simulated pathology images may be generated which include pathologies, such as organ deformation, and may include varying degrees of deformities among simulated images, as well as multiple overlapping deformities in a single image. Generating simulated pathology images may produce a robust dataset which may be used to train machine learning models, such as a deep neural network (DNN), to identify a broad range of anatomies, which may or may not include organ deformation and other uncommon pathologies. By augmenting a training data set to include simulated pathology images, the machine learning model may be trained to perform at a similar accuracy level for anatomies with or without organ deformation or other anomalies. An image scan time may be reduced while decreasing a mental burden on a provider. Overall, both provider and patient satisfaction may be increased.

Briefly, the method described herein may include using a pool of cases with deformities and a reference case having normal (e.g., not deformed) or mild pathology data for generating simulated pathology images. A reference case is non-rigidly registered (NRR) to each of the pool of cases with deformities using diffeomorphic constraints to generate a smoothly varying deformation field. The degree of deformation can be controlled using various NRR parameters (e.g., number of iterations, smoothness of the field, and so on). In this way, NRR may offer first level control over a degree of deformity possible. The deformation field is further manipulated considering deformity constraints observed in clinical conditions to further generate varying degrees of deformities. For example, the NRR-based method may be combined with prior knowledge of deformity biomechanics for generating various degrees of deformity from the reference case. The reference case is warped (e.g., deformed) by applying the manipulated deformation field thereto, thus generating a simulated pathology image (e.g., deformed reference case). The simulated pathology image may be further updated to include other patient conditions such as implants and/or pathologies. In other embodiments, the simulated pathology image may be filtered using a machine learning model, such as a deep learning network, to obtain realistic depictions of anatomy or generate multiple contrast changes. More than one patient condition may be thus simulated in addition to simulated deformities. The data so obtained may be used to train various machine learning models and obtain robust performance in clinical datasets. This approach (e.g., generating images having uncommon pathologies and using the images to train deep learning based networks) may allow robust performance of the machine learning models in cases such as kyphosis, scoliosis, vertebrae fracture, Sprengel shoulder, and so on, as datasets including a large number of images with these pathologies are uncommon in actual practice. The methods for generating simulated pathology images may be accomplished on conventional compute platforms (e.g., as opposed to finite element method (FEM)-based methods, which may be compute intensive). This may result in effective data augmentation methodology for training machine learning models to handle deformities (e.g., to give robust performance of machine learning models in presence of abnormalities). Images with deformities/uncommon pathologies may be simulated using reference cases and sample examples of deformity data in a reasonable compute time (e.g., 5-8 min), and may allow for training of machine learning models to have robust performance for organ/patient scans where patient conditions with combinations of deformities are expected in practice but clinical data is few in number.

Figure 3:
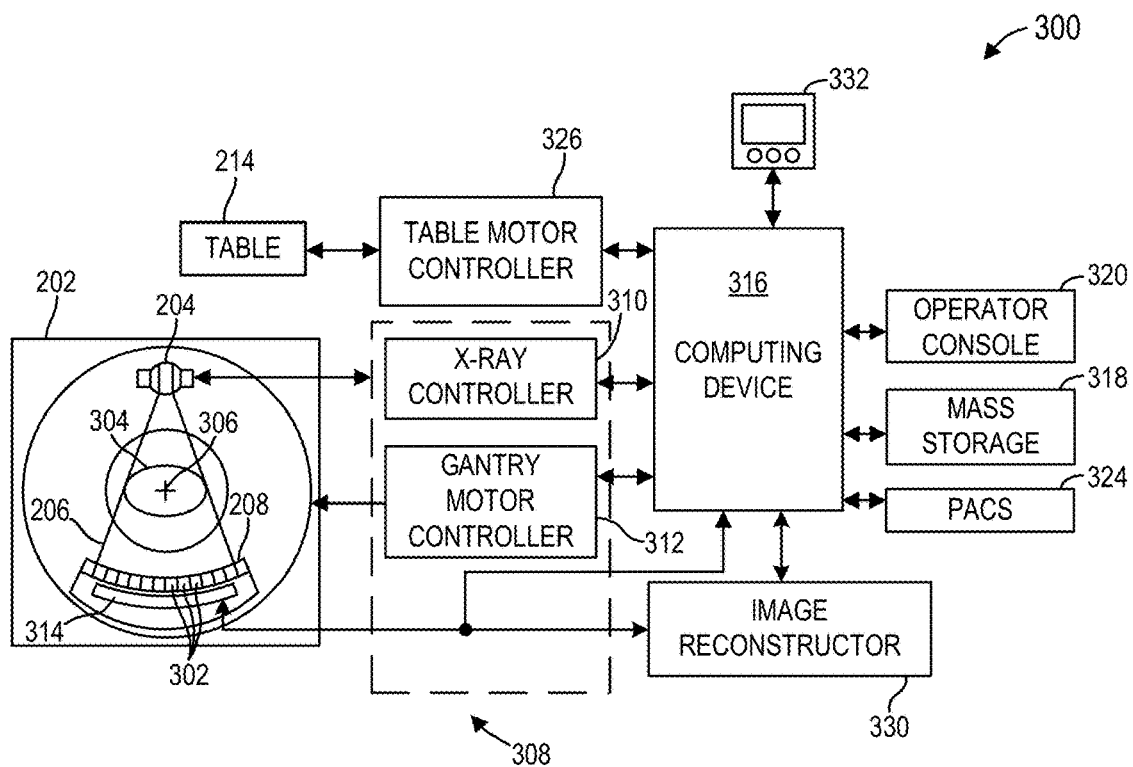
FIG. 3 shows a block schematic diagram of an exemplary imaging system, according to an embodiment.
Figure 4:
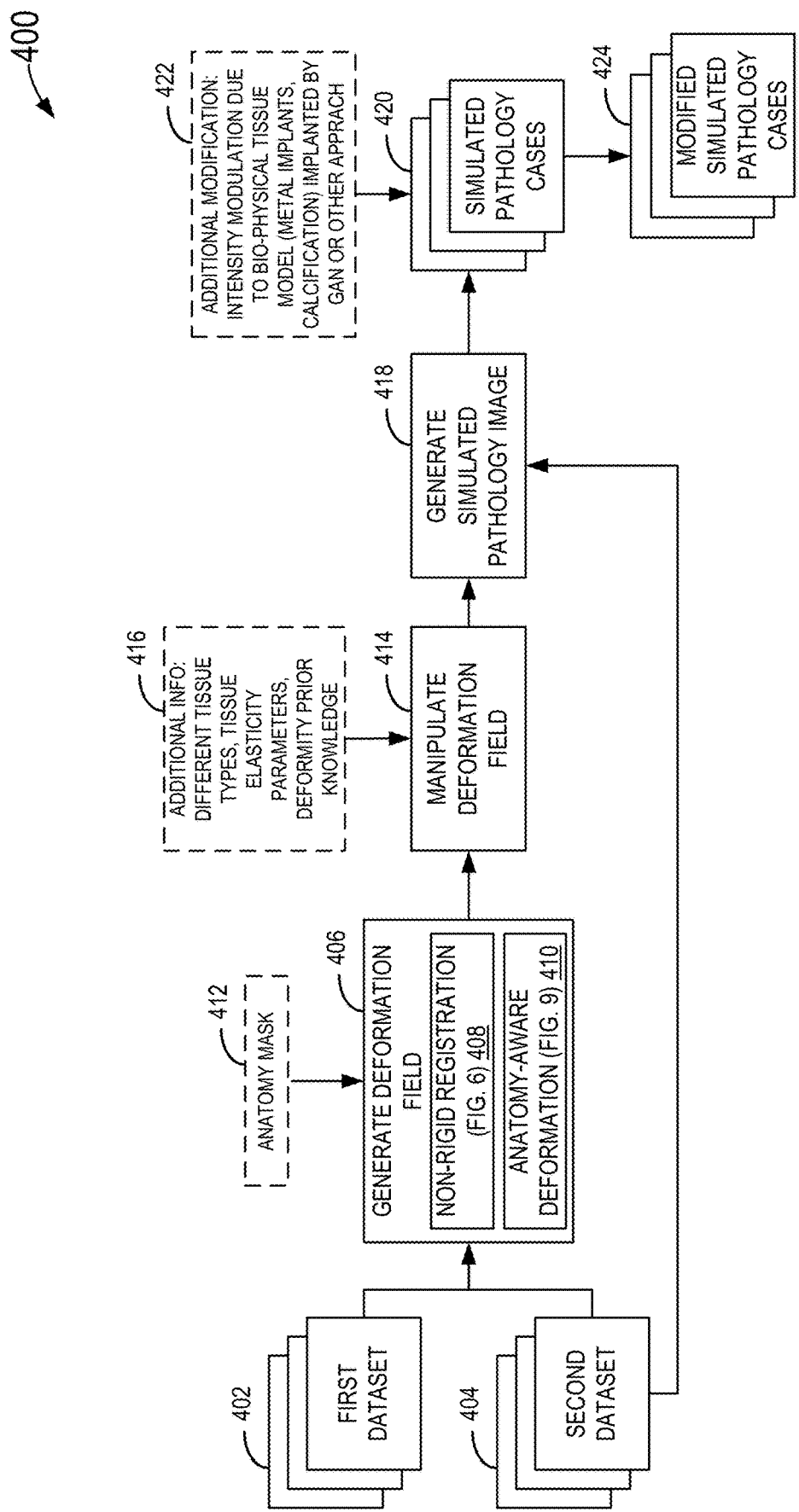
FIG. 4 shows a block diagram of an exemplary workflow for simulating pathology images, according to an embodiment.
Figure 5:
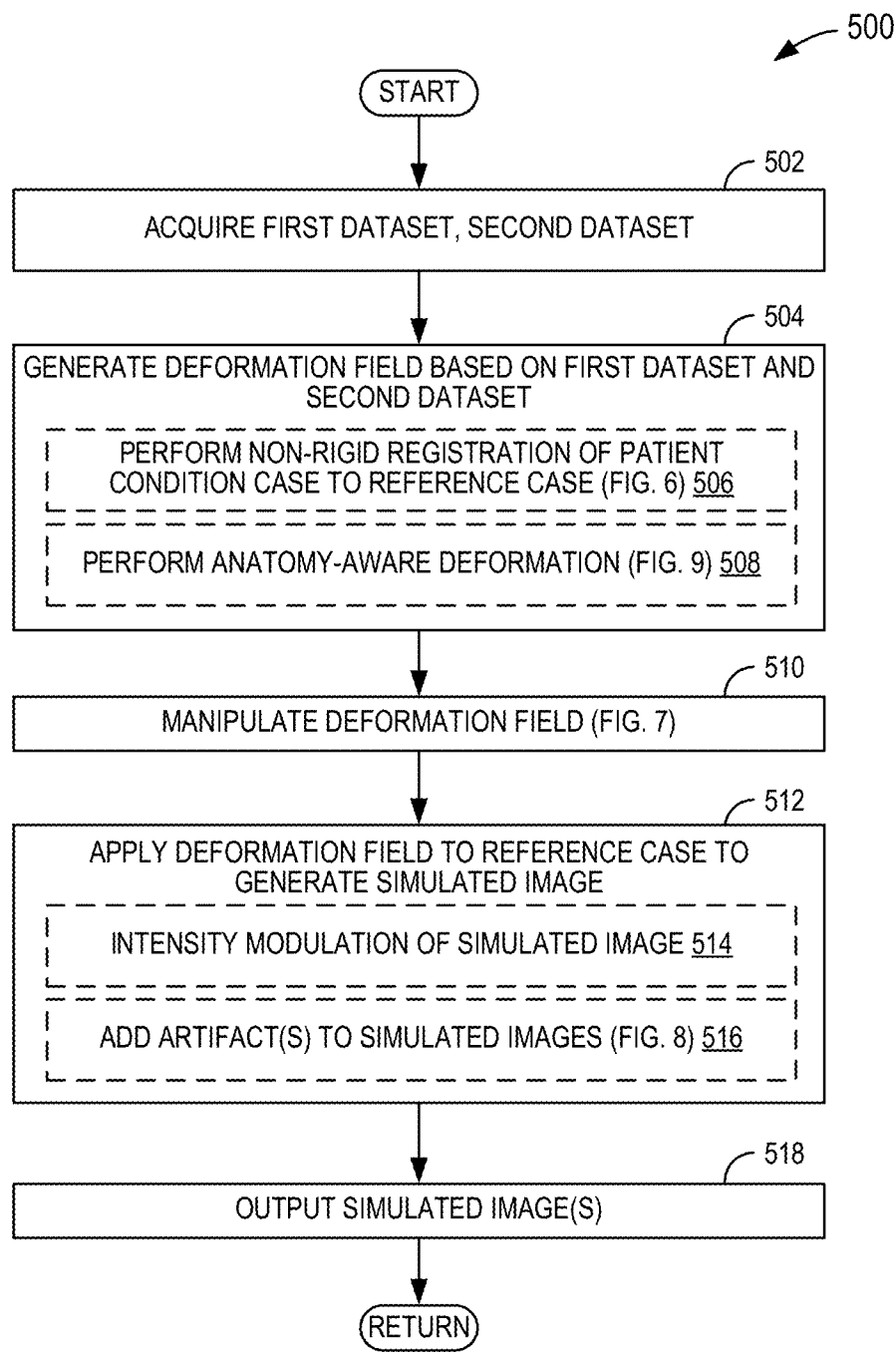
FIG. 5 is a flow chart of an exemplary method for simulating pathology medical images, according to an embodiment.
Figure 6:
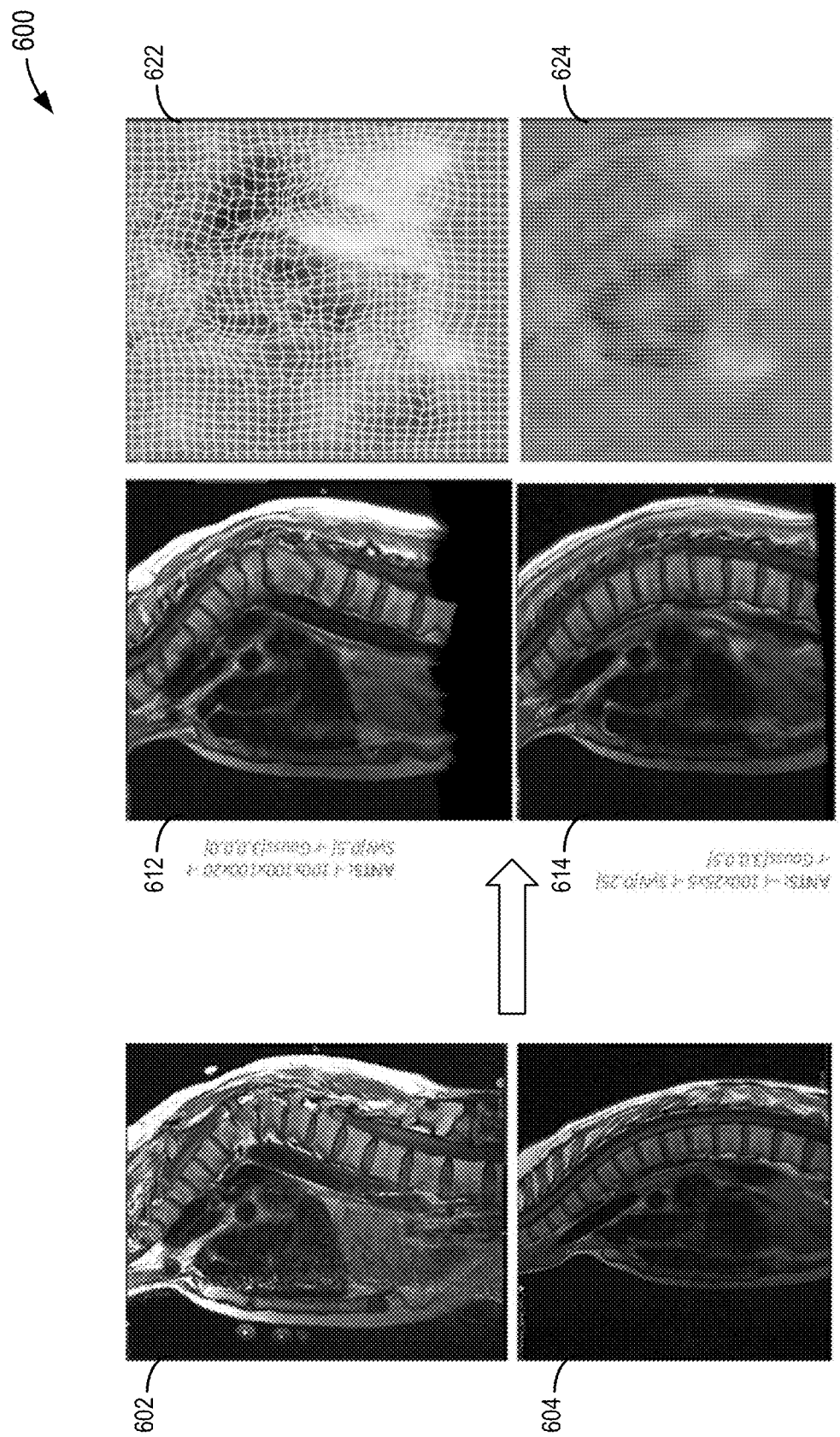
FIG. 6 shows example simulated pathology images and corresponding deformation fields, according to an embodiment.
Figure 7:
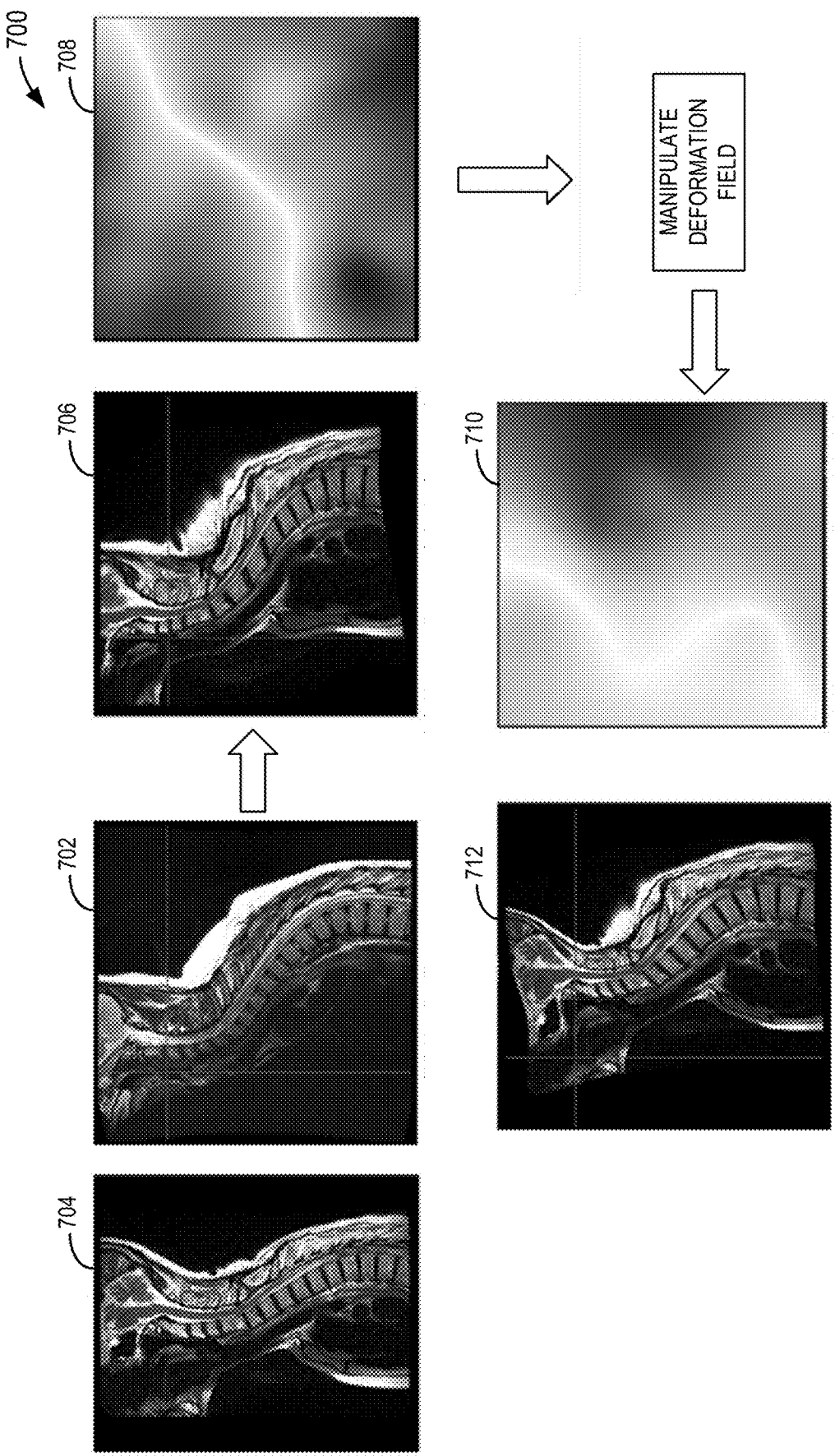
FIG. 7 shows an exemplary workflow for manipulation of a deformation field, according to an embodiment.
Figure 8:
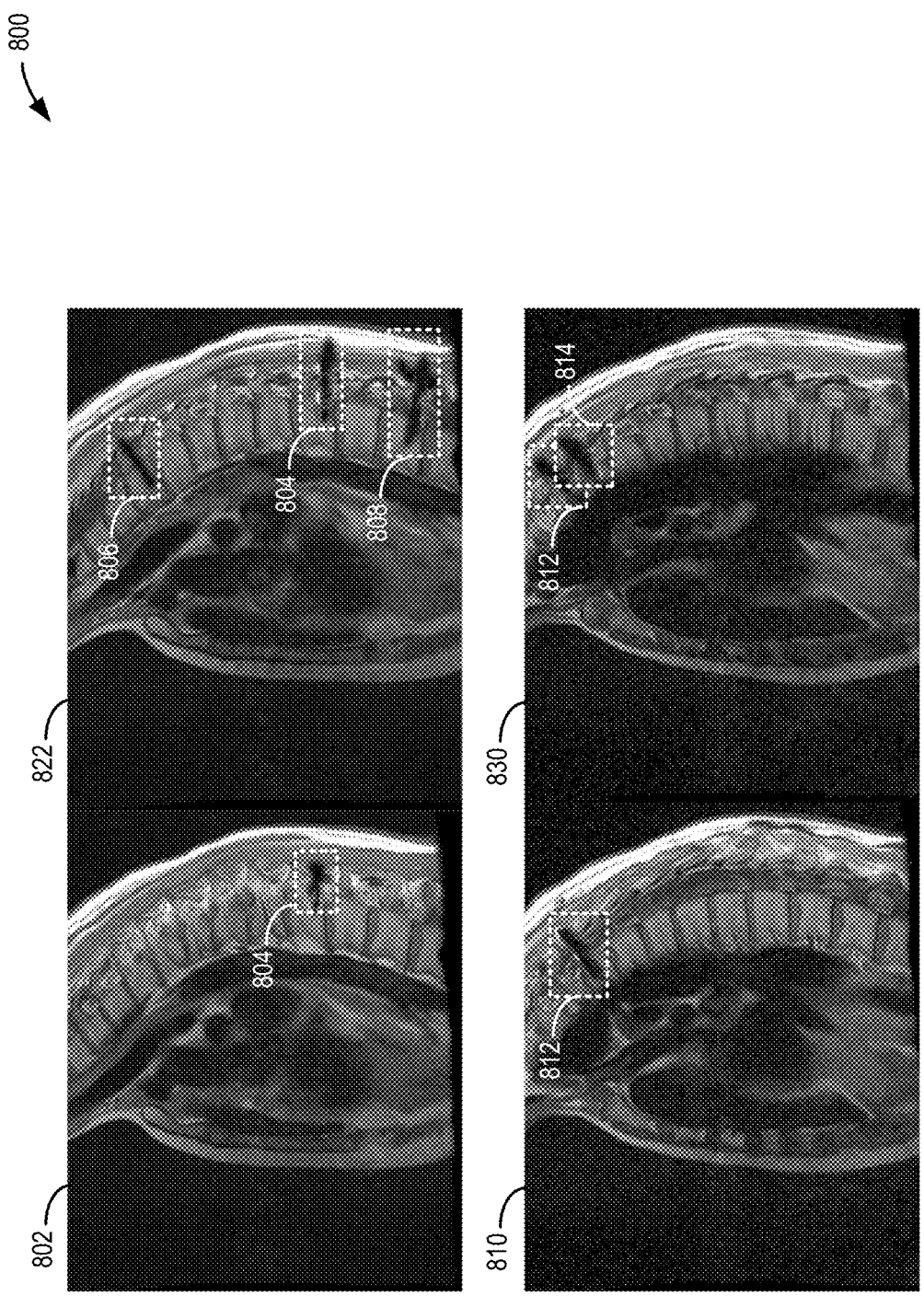
FIG. 8 shows example simulated pathology images with metal augmentation, according to an embodiment.
Figure 9:
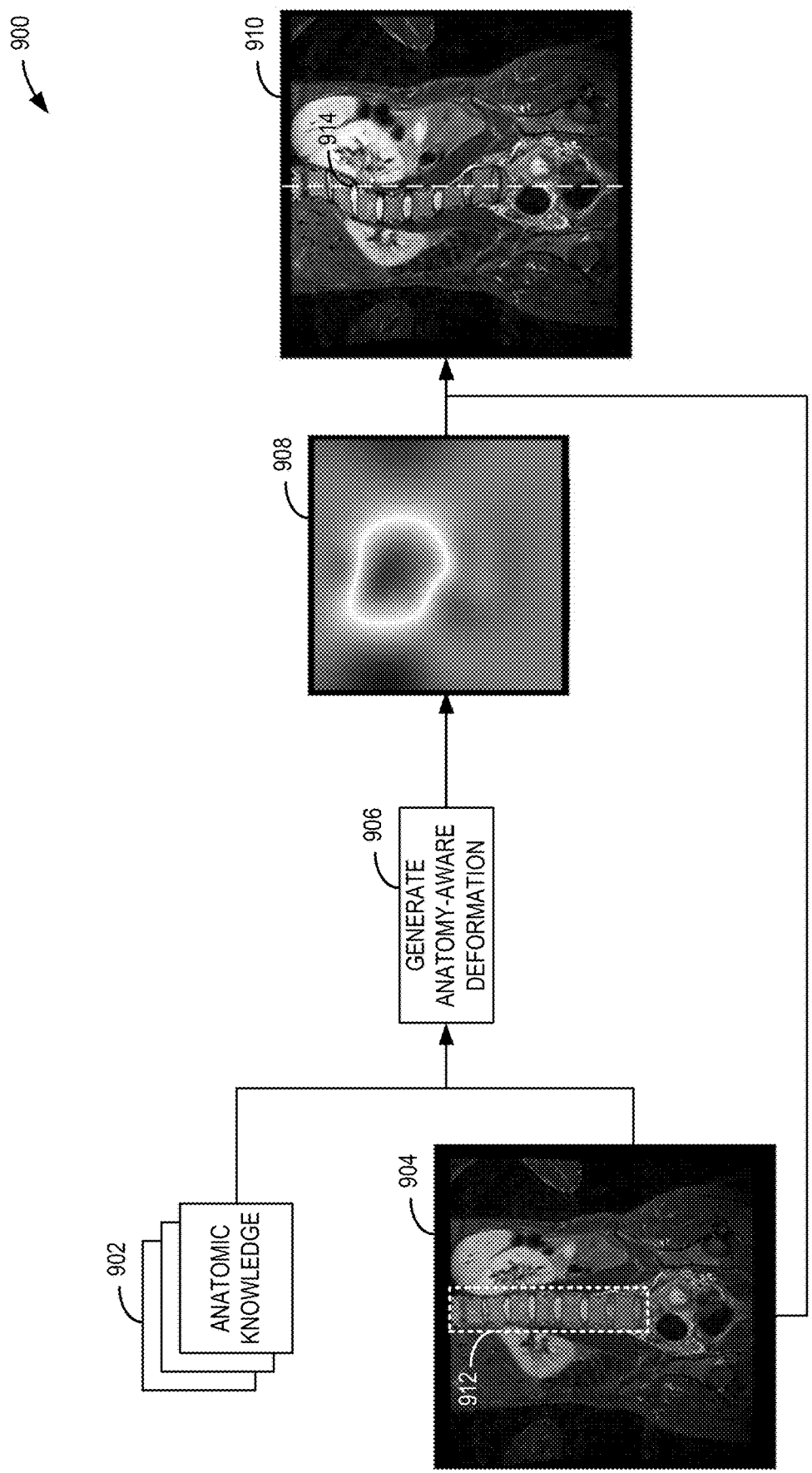
FIG. 9 shows an exemplary workflow for simulating pathology images based on pathology data, according to an embodiment.
Figure 10:
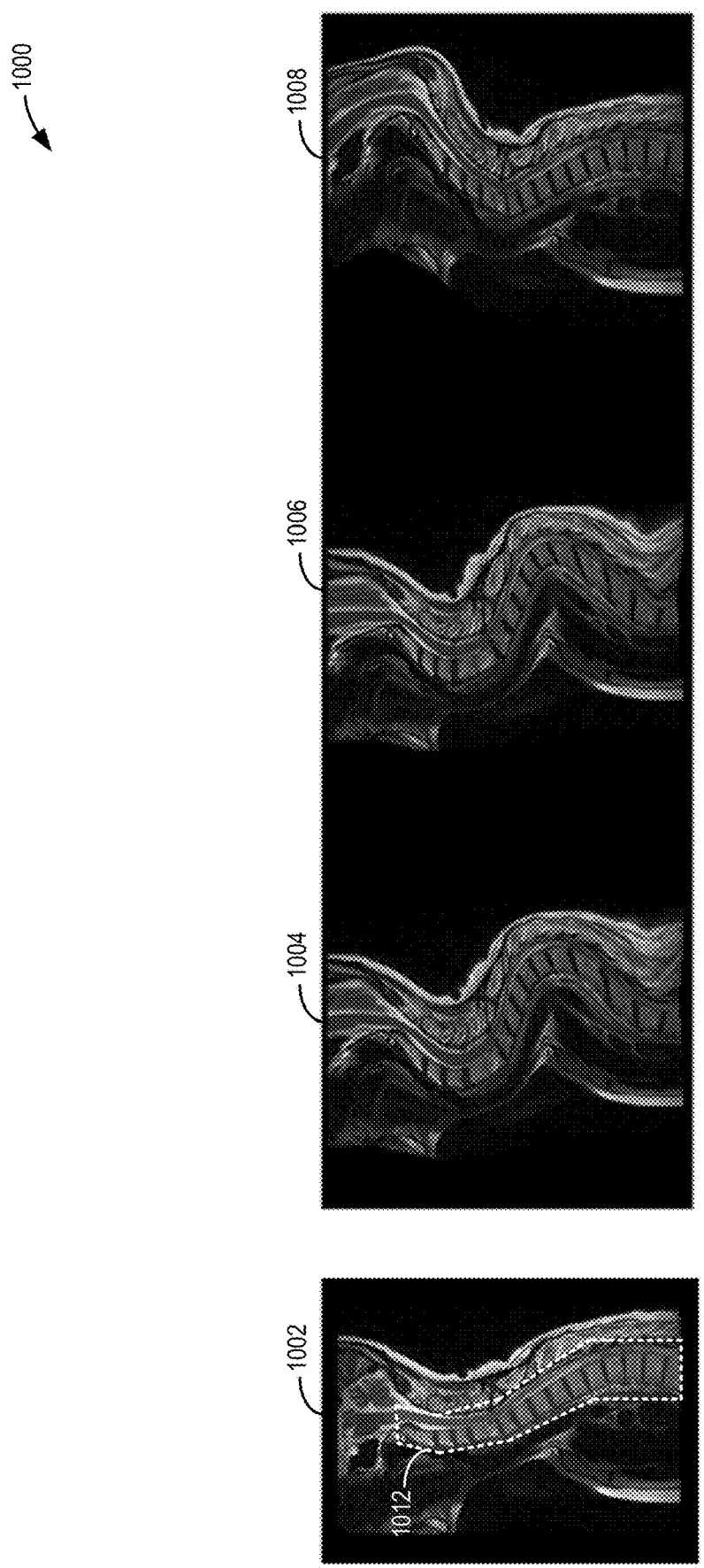
FIG. 10 shows example simulated pathology images having different severities, according to an embodiment.

FIG. 1 shows an exemplary image processing system that may be used to simulate pathology images, such as using the workflow shown in FIG. 4 and according to the method of FIG. 5. An imaging system, such as the CT imaging system shown in FIGS. 2 and 3, may be used to generate images that are retrieved from an image database via the image processing system of FIG. 1 for use in simulating the pathology images. FIG. 6 shows example simulated pathology images and corresponding deformation grids, which may be generated based on existing pathology images and reference cases, according to an embodiment of the workflow of FIG. 4 and the method of FIG. 5. The workflow of FIG. 4 and method of FIG. 5 further include manipulation of the deformation field, an example workflow of which is shown in FIG. 7, and augmentation of simulated images, examples of which are shown in FIG. 8. FIG. 9 shows an embodiment of the workflow of FIG. 4 and method of FIG. 5, which includes generating simulated pathology images based on anatomical knowledge about a pathological condition and a non-pathology image. Simulated pathology images may include different levels of deformation, as shown in the images of FIGS. 6, 8, and 10. Simulated pathology images generated according to the workflow of FIG. 4 and the method of FIG. 5 may be used to train a DNN according to the method shown in FIG. 11. A trained DNN may be an example of a machine learning model which is implemented in an imaging system, such as the imaging processing system of FIG. 1, to detect an anatomical structure with or without deformations (e.g., scoliosis or other deformation pathologies) in medical images which may be generated using the CT imaging system of FIGS. 2 and 3. It may be understood that although the CT imaging system is shown by way of example, other imaging modalities may be used without departing from the scope of this disclosure. Further, the methods described herein are described with respect to organ deformations due to and including scoliosis, and anomalies including metal implants, however the methods described herein may be applied to identify other pathologies and/or anomalies without departing from the scope of this disclosure.

Referring to FIG. 1, an example image processing system 100 is shown. In some embodiments, the image processing system 100 is incorporated into a medical imaging system, such as a magnetic resonance imaging (MRI) system, a computed tomography (CT) system, a single-photon emission computed tomography (SPECT) system, and so on. In some embodiments, at least a portion of the image processing system 100 is disposed at a device (e.g., an edge device or server) communicably coupled to the medical imaging system via wired and/or wireless connections. In some embodiments, the image processing system 100 is disposed at a separate device (e.g., a workstation) that can receive images from the medical imaging system or from a storage device that stores the images generated by the medical imaging system. The image processing system 100 may comprise an image processing device 31, a user input device 32, a display device 33, and a training module 110. For example, the image processing device 31 may be operatively/communicatively coupled to the user input device 32, the display device 33, and the training module 110.

The image processing device 31 includes a processor 104 configured to execute machine readable instructions stored in a non-transitory memory 106. The processor 104 may be single core or multi-core, and the programs executed by processor 104 may be configured for parallel or distributed processing. In some embodiments, the processor 104 may optionally include individual components that are distributed throughout two or more devices, which may be remotely located and/or configured for coordinated processing. In some embodiments, one or more aspects of the processor 104 may be virtualized and executed by remotely-accessible networked computing devices configured in a cloud computing configuration. In some embodiments, the processor 104 may include other electronic components capable of carrying out processing functions, such as a digital signal processor, a field-programmable gate array (FPGA), or a graphic board. In some embodiments, the processor 104 may include multiple electronic components capable of carrying out processing functions. For example, the processor 104 may include two or more electronic components selected from a plurality of possible electronic components, including a central processor, a digital signal processor, a field-programmable gate array, and a graphics board. In still further embodiments, the processor 104 may be configured as a graphical processing unit (GPU), including parallel computing architecture and parallel processing capabilities.

The non-transitory memory 106 may store a simulation module 112 and medical image data 114. The simulation module 112 may include computer executable code, which may be executed by the processor 104. For example, the simulation module 112 may store code which includes instructions for implementing a method for simulating pathology images based on reference cases and at least one of a pathology image or anatomical knowledge. Further detail regarding methods for simulating pathology images is described with respect to FIGS. 4-10.

The medical image data 114 may be comprised of at least one dataset including information about medical images. The medical image data 114 includes, for example, functional imaging images captured by a functional imaging modality, such as SPECT and PET systems, anatomical images captured by an MRI system or a CT system, and so on. In the embodiments disclosed herein, the medical image data 114 may include a pathology dataset, where the pathology dataset includes medical images including pathology, such as organ deformation including kyphosis, scoliosis, vertebrae fracture, Sprengel shoulder, and so on. As described herein, medical images including anatomies having pathological deformations may be referred to as patient images. Additionally or alternatively, the pathology dataset may include data on characteristics of pathological deformities. For example, a diagnosis of a mild case of scoliosis may be based on a spine which twists and/or curves from a centerline of a patient's back at greater than a threshold angle. The threshold angle may be stored as part of the pathology dataset and may be used to identify medical images which show at least mild cases of scoliosis. Although simulated pathology images including scoliosis are described herein, the methods and systems for generating simulated pathology images may be applied to simulate pathology images including deformities other than those associated with scoliosis. The medical image data 114 may further include a reference dataset, where the reference dataset includes medical images with or without anatomical pathologies. For example, medical images of the reference dataset without pathology may be considered nominal, and are thus herein referred to as reference cases. In other embodiments, reference cases may include anatomical pathology which is considered mild by medical practitioners.

In some embodiments, the non-transitory memory 106 may include components disposed at two or more devices, which may be remotely located and/or configured for coordinated processing. In some embodiments, one or more aspects of the non-transitory memory 106 may include remotely-accessible networked storage devices in a cloud computing configuration. For example, medical image data 114, including the pathology dataset and the reference dataset, may be stored on a device other than, and communicatively coupled to, the image processing device 31. The pathology dataset and the reference dataset may further be stored on separate devices. The medical image data 114 may thus be retrieved as part of implementing the simulation module 112. For example, and as further described with respect to FIGS. 4-10, the method may include acquiring the pathology dataset and acquiring the reference dataset, which may include retrieving medical image data 114 from either the non-transitory memory 106 of the image processing device 31 and/or a device communicably coupled to the image processing device 31 with the pathology dataset and/or the reference dataset stored thereon.

The training module 110 may be communicably coupled to the image processing device 31, and includes instructions for training one or more machine learning models. For example, the training module 110 may include instructions that, when executed by a processor coupled to the training module 110 (e.g., the processor 104 or a processor of another device on which the training module 110 is stored) cause the processor to perform training of a machine learning model, such as a deep learning method for identifying deformities in medical images. In some embodiments, the machine learning model may be used in intelligent scan plane planning, which uses landmark information to place coverage extent and scan planes. By training the machine learning model using images which include anatomical deformities, as well as images without anatomical deformities, the machine learning model may be able to identify anatomical deformations as landmarks. In one example, the training module 110 includes instructions for receiving simulated pathology images generated by the simulation module 112, which may be stored in the medical image data 114. Each of the simulated medical images may include associated ground truth labels/images for use in training one or more of the machine learning models. The training module 110 may receive simulated pathology images and associated ground truth labels/images for use in training the one or more machine learning models. In some embodiments, one or more aspects of the training module 110 may include remotely-accessible networked storage devices configured in a cloud computing configuration. Further, in some embodiments, the training module 110 is included in the non-transitory memory 106. Additionally or alternatively, in some embodiments, the training module 110 may be used to train the one or more machine learning models offline and remote from the image processing system 100. In such embodiments, the training module 110 may not be included in the image processing system 100 but may generate data stored in the image processing system 100.

The one or more machine learning models may include one or more deep learning networks (e.g., a DNN), comprising a plurality of weights and biases, activation functions, loss functions, gradient descent algorithms, and instructions for implementing the one or more machine learning models to identifying deformities in medical images. In some embodiments, the training module 110 may include the one or more machine learning models, whereas in other embodiments, the one or more machine learning models may be stored on a device other than the device storing the training module 110. Further details regarding using simulated pathology images (e.g., as described with respect to FIGS. 4-10) to train a machine learning model are described with respect to FIG. 11. In this way, simulated pathology images generating by executing instructions of the simulation module 112 may be used by the training module 110 to train a machine learning model (e.g., a DNN) to identify pathologies in imaging data.

The image processing system 100 may further include the user input device 32. The user input device 32 may comprise one or more of a touchscreen, a keyboard, a mouse, a trackpad, a motion sensing camera, or another device configured to enable a user to interact with and manipulate data within the image processing device 31. As an example, the user input device 32 may enable a user to analyze and sort simulated pathology images, and/or too select an anatomy for which to simulate deformities.

The display device 33 may include one or more display devices utilizing any type of display technology. In some embodiments, the display device 33 may comprise a computer monitor and may display unprocessed images, processed images, simulated images, parametric maps, and/or exam reports. The display device 33 may be combined with the processor 104, the non-transitory memory 106, and/or the user input device 32 in a shared enclosure or may be a peripheral display device. The display device 33 may include a monitor, a touchscreen, a projector, or another type of display device, which may enable a user to view medical images and/or interact with various data stored in the non-transitory memory 106.

It may be understood that the image processing system 100 shown in FIG. 1 is a non-limiting embodiment of an image processing system, and other image processing systems may include more, fewer, or different components without parting from the scope of this disclosure. As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

Figure 2:
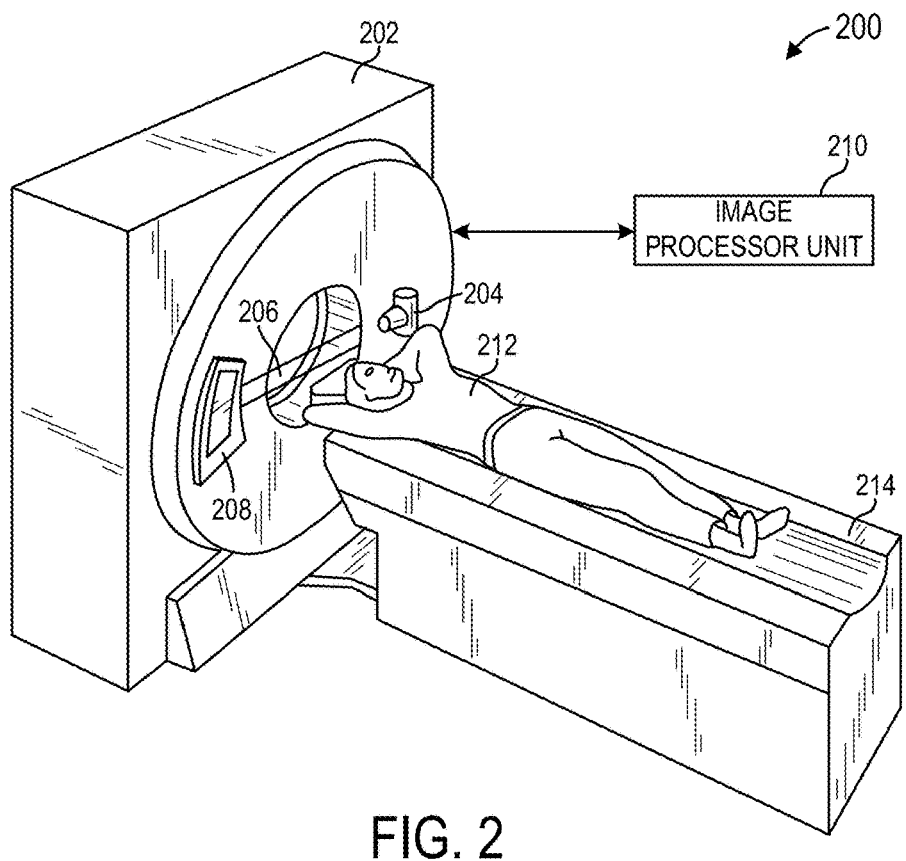
FIG. 2 shows a pictorial view of an imaging system that may utilize an image processing system, such as image processing system of FIG. 1, according to an embodiment.

FIG. 2 illustrates an exemplary CT system 200 configured for CT imaging. Particularly, the CT system 200 is configured to image a subject 212, such as a patient, an inanimate object, an in vitro tissue sample, one or more manufactured parts, and/or foreign objects such as dental implants, stents, and/or contrast agents present within the body. The CT system 200 may be used to generate medical images processed by the image processing system 100 of FIG. 1, for example, although other imaging modalities are also possible (e.g., MRI, PET, SPECT, and so forth). In one embodiment, the CT system 200 includes a gantry 202, which, in turn, may include at least one x-ray source 204 configured to project a beam of x-ray radiation 206 for use in imaging the subject 212 laying on a table 214. Specifically, the x-ray source 204 is configured to project the x-ray radiation 206 toward a detector array 208 positioned on the opposite side of the gantry 202. Although FIG. 2 depicts only a single x-ray source 204, in certain embodiments, multiple x-ray sources and detectors may be employed to project a plurality of x-ray radiation beams 206 for acquiring projection data at different energy levels corresponding to the patient. In some embodiments, the x-ray source 204 may enable dual- or multi-energy imaging by kilovoltage (kVp) switching. In some embodiments, the x-ray detector array 208 is a photon-counting detector, which is capable of differentiating x-ray photons of different energies. In other embodiments, two sets of x-ray sources and detectors are used to generate dual-energy projections, with one set at low-kVp and the other at high-kVp. It should thus be appreciated that the methods described herein may be implemented with single energy acquisition techniques as well as dual- or multi-energy acquisition techniques.

In certain embodiments, the CT system 200 further includes an image processor unit 210 configured to reconstruct images of a target volume of the subject 212 using an iterative or analytic image reconstruction method. For example, the image processor unit 210 may use an analytic image reconstruction approach, such as filtered back projection (FBP), to reconstruct images of a target volume of the subject 212. As another example, the image processor unit 210 may use an iterative image reconstruction approach, such as advanced statistical iterative reconstruction (ASIR), conjugate gradient (CG), maximum likelihood expectation maximization (MLEM), model-based iterative reconstruction (MBIR), and so on, to reconstruct images of a target volume of the subject 212. As described further herein, in some examples, the image processor unit 210 may use both an analytic image reconstruction approach such as FBP in addition to an iterative image reconstruction approach. In some examples, the image processor unit 210 may be included as a part of or communicatively coupled to the image processing device 31 of FIG. 1.

In some configurations of the CT system 200, the x-ray source 204 projects a cone-shaped x-ray radiation beam, which is collimated to lie within an X-Y-Z plane of a Cartesian coordinate system and generally referred to as an "imaging plane." The x-ray radiation beam 206 passes through an object being imaged, such as the subject 212. The x-ray radiation beam 206, after being attenuated by the object, impinges upon an array of detector elements at the detector array 208. The intensity of the attenuated x-ray radiation beam received at the detector array 208 is dependent upon the attenuation of the x-ray radiation beam by the object. Each detector element of the array produces a separate electrical signal that is a measurement of the x-ray beam attenuation at the detector location. The attenuation measurements from all the detector elements are acquired separately to produce a transmission profile.

In some configurations of the CT system 200, the x-ray source 204 and the detector array 208 are rotated with the gantry 202 within the imaging plane and around the object to be imaged such that an angle at which the x-ray radiation beam 206 intersects the object constantly changes. A group of x-ray radiation attenuation measurements, e.g., projection data, from the detector array 208 at one gantry angle is referred to as a "view." A "scan" of the object includes a set of views made at different gantry angles, or view angles, during at least a partial revolution of the x-ray source and detector. It is contemplated that the benefits of the methods described herein accrue to medical imaging modalities other than CT, so as used herein the term "view" is not limited to the use described above with respect to projection data from one gantry angle. The term "view" is used to mean one data acquisition whenever there are multiple data acquisitions from different angles, whether from a CT, PET, or SPECT acquisition, and/or any other modality including modalities yet to be developed as well as combinations thereof in fused (e.g., hybrid) embodiments.

The projection data is processed to reconstruct an image that corresponds to a two-dimensional slice taken through the object or, in some examples where the projection data includes multiple views or scans, a three-dimensional rendering of the object. One method for reconstructing an image from a set of projection data is referred to as the FBP technique. Transmission and emission tomography reconstruction techniques also include statistical iterative methods such as the MLEM and ordered-subsets expectation-reconstruction techniques as well as iterative reconstruction techniques. This process converts the attenuation measurements from a scan into integers called "CT numbers" or "Hounsfield units" (HU), which are used to control the brightness (or intensity) of a corresponding pixel on a display device.

To reduce the total scan time, a "helical" scan may be performed. To perform the helical scan, the patient is moved while the data for the prescribed number of slices is acquired. Such a system generates a single helix from a cone beam helical scan. The helix mapped out by the cone beam yields projection data from which images in each prescribed slice may be reconstructed. As used herein, the phrase "reconstructing an image" is not intended to exclude embodiments of the present disclosure in which data representing an image is generated but a viewable image is not. Therefore, as used herein, the term "image" broadly refers to both viewable images and data representing a viewable image. However, many embodiments generate (or are configured to generate) at least one viewable image.

FIG. 3 illustrates an exemplary imaging system 300 that is similar to the CT system 200 of FIG. 2. In accordance with aspects of the present disclosure, the imaging system 300 is configured for imaging a subject 304 (e.g., the subject 212 of FIG. 2). In one embodiment, the imaging system 300 includes the detector array 208. As such, components of FIG. 3 that function the same as those introduced in FIG. 2 are numbered the same and will not be reintroduced. The detector array 208 further includes a plurality of detector elements 302 that together sense the x-ray radiation beams 206 that pass through the subject 304 (such as a patient) to acquire corresponding projection data. Accordingly, in one embodiment, the detector array 208 is fabricated in a multi-slice configuration including the plurality of rows of cells or detector elements 302. In such a configuration, one or more additional rows of the detector elements 302 are arranged in a parallel configuration for acquiring the projection data.

In certain embodiments, the imaging system 300 is configured to traverse different angular positions around the subject 304 for acquiring desired projection data. Accordingly, the gantry 202 and the components mounted thereon may be configured to rotate about a center of rotation 306 for acquiring the projection data, for example, at different energy levels. Alternatively, in embodiments where a projection angle relative to the subject 304 varies as a function of time, the mounted components may be configured to move along a general curve rather than along a segment of a circle.

As the x-ray source 204 and the detector array 208 rotate, the detector array 208 collects data of the attenuated x-ray beams. The data collected by the detector array 208 undergoes pre-processing and calibration to condition the data to represent the line integrals of the attenuation coefficients of the scanned subject 304. The processed data are commonly called projections. In some examples, the individual detectors or detector elements 302 of the detector array 208 may include photon-counting detectors that register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 300 reveals internal features of the subject 304, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 300 includes a control mechanism 308 to control movement of the components such as rotation of the gantry 202 and the operation of the x-ray source 204. In certain embodiments, the control mechanism 308 further includes an x-ray controller 310 configured to provide power and timing signals to the x-ray source 204. Additionally, the control mechanism 308 includes a gantry motor controller 312 configured to control a rotational speed and/or position of the gantry 202 based on imaging parameters.

In certain embodiments, the control mechanism 308 further includes a data acquisition system (DAS) 314 configured to sample analog data received from the detector elements 302 and convert the analog data to digital signals for subsequent processing. The DAS 314 may be further configured to selectively aggregate analog data from a subset of the detector elements 302 into so-called macro-detectors, as described further herein. The data sampled and digitized by the DAS 314 is transmitted to a computing device 316. In one example, the computing device 316 stores the data in a storage device 318. The storage device 318, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 316 provides commands and parameters to one or more of the DAS 314, the x-ray controller 310, and the gantry motor controller 312 for controlling system operations such as data acquisition and/or processing. In certain embodiments, the computing device 316 controls system operations based on operator input. The computing device 316 receives the operator input, for example, including commands and/or scanning parameters via an operator console 320 operatively coupled to the computing device 316. The operator console 320 may include a keyboard (not shown) or a touchscreen, for example, to allow the operator to specify the commands and/or scanning parameters.

Although FIG. 3 illustrates only one operator console 320, more than one operator console may be coupled to the imaging system 300, for example, for inputting or outputting system parameters, requesting examinations, plotting data, and/or viewing images. Further, in certain embodiments, the imaging system 300 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, and so on. For example, imaging system 300 may be coupled to image processing system 100 of FIG. 1.

In one embodiment, for example, the imaging system 300 either includes, or is coupled to, a picture archiving and communications system (PACS) 324. In an exemplary implementation, the PACS 324 is further coupled to a remote system such as a radiology department information system, hospital information system, and/or to an internal or external network (not shown) to allow operators at different locations to supply commands and parameters and/or gain access to the image data.

The computing device 316 uses the operator-supplied and/or system-defined commands and parameters to operate a table motor controller 326, which in turn, may control the table 214, which may be a motorized table. Specifically, the table motor controller 326 may move the table 214 for appropriately positioning the subject 304 in the gantry 202 for acquiring projection data corresponding to the target volume of the subject 304.

As previously noted, the DAS 314 samples and digitizes the projection data acquired by the detector elements 302. Subsequently, an image reconstructor 330 uses the sampled and digitized x-ray data to perform high-speed reconstruction. Although FIG. 3 illustrates the image reconstructor 330 as a separate entity, in certain embodiments, the image reconstructor 330 may form part of the computing device 316. Alternatively, the image reconstructor 330 may be absent from the imaging system 300, and instead the computing device 316 may perform one or more functions of the image reconstructor 330. Moreover, the image reconstructor 330 may be located locally or remotely, and may be operatively connected to the imaging system 300 using a wired or wireless network. Particularly, one exemplary embodiment may use computing resources in a "cloud" network cluster for the image reconstructor 330. Further, in some examples, the image reconstructor 330 is included as a part of image processor unit 210 of FIG. 2.

In one embodiment, the image reconstructor 330 stores the images reconstructed in the storage device 318. Alternatively, the image reconstructor 330 may transmit the reconstructed images to the computing device 316 for generating useful patient information for diagnosis and evaluation. In certain embodiments, the computing device 316 may transmit the reconstructed images and/or the patient information to a display 332 communicatively coupled to the computing device 316 and/or the image reconstructor 330. In some embodiments, the display 332 allows the operator to evaluate the imaged anatomy. The display 332 may also allow the operator to select a volume of interest (VOI) and/or request patient information, for example, via a graphical user interface (GUI) for a subsequent scan or processing.

In some embodiments, the reconstructed images may be transmitted from the computing device 316 or the image reconstructor 330 to the storage device 318 for short-term or long-term storage. Further, in some embodiments, the computing device 316 may be or may be operationally coupled to the processor 104 of FIG. 1. As such, raw data and/or images reconstructed from data acquired by the imaging system 300 may be transmitted to the image processing system 100 (see FIG. 1) for further processing and analysis. Further, the various methods and processes described further herein (such as the methods described below with reference to FIGS. 4-11) may be stored as executable instructions in non-transitory memory on a computing device (or controller).

As briefly described above, medical images captured by an imaging system, such as the CT system 200 of FIG. 2 and/or the exemplary imaging system 300 of FIG. 3 may be used to generate simulated pathology images of a same imaging modality (e.g., CT, X-ray, MRI, and so on). Captured medical images may include images with pathologies (herein "patient images") and images with or without pathologies (herein "reference cases"). Additionally or alternatively, reference cases may be used in combination with anatomical knowledge (e.g., pathology characteristics) to generate simulated pathology images. The simulated pathology images may be used to train a machine learning model to identify anatomies, which may be deformed due to pathology, in medical images (e.g., captured by the imaging system). Turning now to FIGS. 4-10, workflows, methods, and example images are shown for generating simulated pathology images from pathology data (e.g., patient images and/or pathology characteristics) and reference cases.

FIG. 4 illustrates a workflow 400 for generating simulated pathology images using a deformation field based on pathology data and reference cases. As briefly described above, pathology data may include at least one of medical images showing anatomies having deformities, herein referred to as patient images, and anatomical knowledge, such as characteristics and/or parameters of known pathologies. Reference cases may include the same anatomies as are included in the patient images or referred to by the anatomical knowledge, however anatomies of the reference cases may not be deformed or may have mild or common deformations compared to those of pathology data. When patient images are used, the patient image may or may not be of a same imaging modality (e.g., CT, X-ray, MRI, and so on) as the reference case. The workflow 400 may include acquiring a pathology dataset and a reference dataset, generating a deformation field based on a patient image of the pathology dataset and a reference case of the reference dataset, manipulating the deformation field, applying the deformation field to a reference case of the reference dataset to generate a simulated pathology image, and optionally modifying the simulated pathology image to provide further deformation and/or anomalies to the anatomy. The simulated pathology image may be output for display or storage, such as on the display device 33 or the medical image data 114, respectively, of the image processing system 100. A single reference case may be mapped to a plurality of patient images such that a number of deformation fields generated is equal to at least the number of patient images to which the single reference case is registered.

Workflow 400 includes acquiring a pathology dataset 402 and a reference dataset 404 from which to generate a deformation field 406. The pathology dataset 402 may be pathology data, as described above, and include at least one of patient images or anatomical knowledge. As described above, patient images may include embodiments of deformities of an anatomical region. Anatomical knowledge may include characteristics and parameters of anatomies within the anatomical region, and may include anatomies with deformities and, optionally, without deformities. The reference dataset 404 may be reference cases. Each reference case of the reference cases may be an image showing an anatomy without a deformity or with a deformity. Each of the patient images and the reference cases may be radiological images, such as may be captured by a CT system, MRI apparatus, and so on. The pathology dataset 402 may include a plurality of patient images and/or anatomical knowledge generated based on a plurality of patient cases, wherein the plurality of patient images and/or anatomical knowledge show the same type of pathology. As described herein, the pathology dataset 402 show scoliosis, however other pathology datasets which show other pathology types may be used according to the herein described methods without departing from the scope of the present disclosure. The pathology dataset 402 shows the same pathology as is shown in the reference case to be deformed.

As described with reference to FIGS. 1-3 each of the pathology dataset 402 and the reference dataset 404 may be stored in the medical image data 114 of the image processing device 31 of FIG. 1. Additionally or alternatively, either or both of the pathology dataset 402 and the reference dataset 404 may be stored on a device coupled to the image processing device which is executing the workflow 400. Acquiring the pathology dataset 402 and the reference dataset 404 may include retrieving each the pathology dataset 402 and the reference dataset 404 from the device on which it is stored.

Generation of a deformation field 406 may be performed by comparing data from the pathology dataset 402 and the reference dataset 404. For example, a first method of deformation field generation includes non-rigid registration 408 of a patient image (e.g., of the pathology dataset 402) with at least one reference case (e.g., of the reference dataset 404). A single patient image may be non-rigidly registered with more than one reference case and, additionally, each reference case may be non-rigidly registered to more than one patient image to generate different deformation fields, as further described herein. For example, non-rigid registration may include applying spatial deformation to the reference case, using random translation, rotation, and non-rigid deformation, which may deform the reference case to resemble the patient image. Non-rigid registration 408 may further include adjusting a severity of deformation, adjusting a level of smoothness, and so on. Further detail regarding non-rigid registration to generate a deformation field is described with respect to FIGS. 6 and 7.

A second method of deformation field generation includes anatomy-aware deformation 410 of a reference case (e.g., of the reference dataset 404) based on anatomical knowledge (e.g., of the pathology dataset 402). The anatomical knowledge may include characteristics of at least one known pathology for a given anatomical region. For example, the anatomical knowledge may include characteristics which are used to diagnose scoliosis cases, where a scoliosis diagnosis may be made for a spine which twists and/or curves from a centerline of a patient's back at greater than a threshold angle. The reference case may include a spine region with no deformity or with a level of deformity which is considered mild scoliosis or not considered to warrant a scoliosis diagnosis. Each of the reference case and the anatomical knowledge may be input into a deformation algorithm which may deform the reference case according to parameters of the anatomical knowledge. For example, the deformation algorithm may segment the spine region, determine a degree of spine angulation by comparing positions of at least three landmark points along the segmented spine region, then distort a segmentation mask of the spine region until a threshold level of spine angulation commiserate with scoliosis (e.g., as indicated by the anatomical knowledge). Further detail regarding generating the deformation field using anatomy-aware deformation is described with respect to FIGS. 9 and 10.

In some embodiments, an anatomy mask 412 may be used in addition to anatomy data from the pathology dataset 402 and the reference dataset 404 to generate the deformation field 406. For example, the anatomy mask 412 may indicate a spine region and may be overlaid on the reference case to indicate a region to be deformed during non-rigid registration 408 and/or anatomy-aware deformation 410. Further detail regarding use of an anatomy mask to assist in generating a deformation field is described with respect to FIGS. 9 and 10.

The workflow 400 further includes manipulating the deformation field 414. The deformation field generated via non-rigid registration 408 or anatomy-aware deformation 410 may be manipulated to adjust regions of the deformation field, and therefore the simulated pathology image generated thereby, to be more or less deformed. The deformation field may be manipulated by using additional information 416, which may include tissue elasticity parameters, prior knowledge of deformities/pathologies, deformation parameters of different tissue types, and so on. For example, the additional information may be the anatomical knowledge of the pathology dataset 402 when the deformation field is generated via non-rigid registration 408 of a patient image (e.g., of the pathology dataset 402) and a reference case (e.g., of the reference dataset 404). Further detail regarding manipulation of the deformation field is described with respect to FIGS. 7 and 10.

A manipulated deformation field may be applied to a reference case (e.g., of the reference dataset 404) to generate a simulated pathology image 418. The reference case to which the modified deformation field is applied may be the same reference case used to generate the deformation field via non-rigid registration 408 or anatomy-aware deformation 410. Additionally or alternatively, the reference case may be a different case than the reference case used to generate the deformation field, but which includes the same anatomy used therein (e.g., a spine region). Applying the manipulated deformation field to the reference case may include overlaying the manipulated deformation field on the reference case such that pixels of the reference case are manipulated according to the deformation field. Example simulated pathology images and respective deformation fields are shown and described in further detail with respect to FIGS. 6-7 and 9-10.

In some embodiments, multiple manipulations of the deformation field may result in generation of multiple deformation fields which, in addition to the generated deformation field, may be applied to the reference case to generate multiple simulated pathology cases 420. Each simulated pathology image of the simulated pathology cases 420 may include different embodiments of the simulated pathology (e.g., different deformation severity, different deformed regions, and so on). Examples of differences in simulated pathology images are described with respect to FIGS. 6 and 10.

The workflow 400 may include optionally modifying at least one simulated pathology case of the simulated pathology cases 420 to provide further deformation and/or anomalies to the anatomy. For example, additional modification 422 of the simulated pathology cases 420 may include intensity modulation due to a bio-physical tissue model to simulate metal implants, calcification, further tissue deformation, and so on. In some embodiments, optional modification to the simulated pathology case may be implemented by a generative adversarial network (GAN) or other approach. In some embodiments, additional modification 422 of the simulated pathology image may include deforming the simulated pathology image using a deformation field generated based on a different pathology then the pathology shown in the simulated pathology image. For example, a first simulated pathology image including a simulated deformation pathology of scoliosis may be generated according to the workflow 400 using a first reference case and a first patient case with a first pathology (e.g., scoliosis). A second simulated pathology image including a simulated deformation pathology of Sprengel shoulder may be generated according to the workflow 400 using a second patient case with a second pathology (e.g., Sprengel shoulder) and may use the first reference case or a different reference case. The first simulated pathology image may be modified by applying a deformation field used to generate the second simulated pathology image to the first simulated pathology image. In this way, a modified first simulated pathology image is generated which may include simulated pathology deformations of scoliosis and Sprengel shoulder. Embodiments of modified simulated pathology cases are further described with respect to FIG. 8.

The simulated pathology cases 420 and/or modified simulated pathology case 424, collectively referred to herein as simulated pathology images, may be output for display or storage. For example, the simulated pathology images may be output for display on the display device 33 of the image processing system 100. Additionally or alternatively, the simulated pathology images may be output for storage on memory of the image processing device 31 (e.g., medical image data 114). In other embodiments, the simulated pathology images may be output to a storage device communicably coupled to the image processing device 31 and the training module 110 or other device which uses the simulated pathology images to train a machine learning model (e.g., a DNN) to identify anatomies having deformities or other pathology characteristics, as further described herein with respect to FIG. 11. In this way, simulated pathology images may be generated using deformation fields generated based on pathology and non-pathology data.

Turning to FIG. 5, a flow chart is shown, illustrating a method 500 for a simulation module, such as simulation module 112 of FIG. 1, which may take patient images displaying pathology embodiments and reference cases with or without pathology embodiments as input, and may output simulating pathology images, each including at least one pathology embodiment. The method 500 may be used to direct the workflow 400 of FIG. 4. In some embodiments, the method 500 may be implemented by an image processing device, such as the image processing device 31 of the image processing system 100. For example, instructions for implementing the method 500 may be stored in the simulation module 112 of the image processing device 31. Method 500 is described with regard to the systems and components of FIGS. 1-3, though it should be appreciated that the method 500 may be implemented with other systems and components without departing from the scope of the present disclosure. Method 500 may be carried out according to instructions stored in non-transitory memory of a computing device, such as image processing system 100 of FIG. 1.

At 502, the method 500 includes acquiring a pathology dataset and acquiring a reference dataset. As described with respect to the workflow 400 of FIG. 4, the pathology dataset may include at least one of a plurality of medical images which include various pathologies for a given anatomy (e.g., patient images), and anatomical knowledge of pathological characteristics for the given anatomy. As described herein with respect to FIGS. 6-10, the given anatomy may be a spine region and the pathology may be scoliosis, however other anatomies and other pathologies may be included in the pathology dataset without departing from the scope of the present disclosure. The reference dataset may include a plurality of medical images which include the given anatomy (e.g., of the pathology dataset) and may or may not include pathologies (e.g., reference cases). In some embodiments, while the reference cases may not include pathologies, anomalies such as metal implants and/or calcification may be included. Acquiring the pathology dataset and the reference dataset may include retrieving the pathology dataset and the reference dataset from respective devices on which they are stored. In some embodiments, the pathology dataset and the reference dataset may be stored on the device which is executing the method 500, such as an image processing device (e.g., the image processing device 31 of FIG. 1). In other embodiments, the pathology dataset and the reference dataset may be stored on devices other than, but communicatively coupled to, the device executing the method 500. Further, the pathology dataset and the reference dataset may be stored on the same device or on different devices.

At 504, the method 500 includes generating a deformation field based on the pathology dataset and the reference dataset. The deformation field may be generated using a reference case and pathology information, such as characteristics or parameters, herein described as anatomical knowledge, or a patient image. For example, at 506, generating a deformation field may include performing non-rigid registration of a patient condition case (e.g., the patient image) to a reference case. A patient image may be non-rigidly registered to one of more of the reference cases of the reference dataset and thus may generate a simulated pathology image based on each of the reference cases. Further detail regarding non-rigid registration of the patient condition case to the reference case to generate a deformation field is described with respect to FIG. 6. Alternatively, at 508, generating a deformation field may include performing anatomy-aware deformation of a reference case based on anatomical knowledge. Further detail regarding anatomy-aware deformation is described with respect to FIG. 9.

At 510, the method 500 includes manipulating the deformation field. Manipulating the deformation field may include inputting additional information into an algorithm which adjusts the deformation field accordingly. For example, the additional information may include information about different tissue types, tissue elasticity parameters, prior knowledge of deformities, and so on. This additional information may assist in generating a simulated pathology image having characteristics which may be observed in a medical image captured by an imaging system, such as the CT system 200 of FIG. 2. Further detail regarding manipulation of the deformation field is described with respect to FIG. 7.

At 512, the method 500 includes applying the deformation field to a reference case to generate a simulated pathology image. The simulated pathology image may be a medical image which has simulated pathology characteristics. In other words, the simulated pathology image may be the reference case to which the deformation field is applied, where application of the deformation field may change at least one of a shape, size, and/or configuration of at least one anatomy of interest shown in the reference case to simulate a pathology.

At 514, the method 500 includes intensity modulation of the simulated pathology image. For example, following deformation of the reference case by applying the deformation field thereto, the resulting simulated pathology image may be further modified. For example, intensity modulation may be performed by inputting a bio-physical tissue model and the simulated pathology image into a deformation algorithm, wherein the deformation algorithm may output a modified simulated pathology image where image intensity has been modified in some regions to simulate metal or other implants, calcification, and so on. In some embodiments, intensity modulation may be performed using GAN, as described with respect to FIG. 4.

At 516, the method 500 includes adding at least one artifact to the simulated pathology image which is not present in the reference image. For example, an artifact may be a metal implant, a tumor, a lesion, and so on. Addition of at least one artifact may be optional, and may be performed in addition to or alternatively to intensity modulation of the simulated image. Further detail regarding addition of artifacts to the simulated pathology image is described with respect to FIG. 8.

At 518, the method 500 includes outputting the simulated pathology image. The simulated pathology image may be output for storage on a storage device, such as the medical image data 114 of the non-transitory memory 106 of the image processing device 31 as shown in FIG. 1. As described with respect to operation 506, the patient image may be non-rigidly registered with at least one reference case of the reference dataset. A simulated pathology image may be generated for/based on each reference case. Each simulated pathology image may be grouped with the reference case from which it is generated or may be otherwise labeled such that each of the at least one pathology shown in the simulated pathology image may be identified. As further described with respect to FIG. 11, when using simulated pathology images to train a machine learning model (e.g., a DNN) to detect an anatomical structure with or without deformation (e.g., deformation pathologies) in medical images, the simulated pathology image and at least one associated pathology label may form a ground truth pair and the DNN may be trained to identify the anatomy based on features identified in a medical image.

In this way, a plurality of simulated pathology cases may be generated based on reference cases which may not include pathologies or may include mild pathology cases. The plurality of simulated pathology cases may be used to train a DNN or other machine learning model to identify anatomies in medical images, regardless of anatomical deformation. Training machine learning models using a plurality of simulated pathology cases in addition to available patient images which include pathologies may increase an accuracy of the machine learning models. This may assist in decreasing a time and effort taken by a user, such as a medical provider, to diagnose a pathology based on a medical image.

FIGS. 6-10 will herein be described with respect to the workflow 400 and the method 500, where FIGS. 6-10 include medical images of a spine region. However, the herein described workflow and methods may be applied to medical images collected using imaging systems other than a CT system (e.g., MRI, X-ray, and so on) and may be applied to other anatomical regions without departing from the scope of the present disclosure.

Turning to FIG. 6, an embodiment of non-rigid registration (NRR) 600 is shown, which may be used to generate simulated pathology images and corresponding deformation fields. NRR 600 may be performed as part of the method 500 of FIG. 5 (e.g., at operation 506). Briefly, NRR 600 may include inputting a reference case and a pathology case (e.g., patient image) into a deformation algorithm which may output a deformation field to be applied to the reference case, thus generating a simulated pathology image. Parameters of the deformation algorithm may be adjusted to control a degree of deformation of the deformation field, and therefore of the reference case.

Each of a first patient image 602 and a first reference case 604 may be a medical image which includes a spine region of a patient and is captured using a CT imaging system, such as the CT system 200 of FIG. 2. The patient imaged in the first patient image 602 may be a different patient from the patient imaged in the first reference case 604. In the first patient image 602, the patient may have scoliosis, as may be determined by the angled curvature of the spine and/or by user diagnosis. The pathology diagnosis of scoliosis may be made by a medical professional and the first patient image 602 may be labeled as an image of a scoliosis case, where the label may be saved as metadata of the first patient image 602. The first reference case 604 may not include a spine having scoliosis. In other words, curvature of the spine in the first reference case 604 may not indicate scoliosis, thus the first reference case 604 may be considered a nominal embodiment of a spine. In other embodiments, the first reference case 604 may include a spine which is diagnosed as having mild scoliosis, and a simulated pathology image may be generated by further deforming the first reference case 604 using a deformation field to show a more severe case of scoliosis.

In the embodiment of NRR 600, each of the first patient image 602 and the first reference case 604 may be input into a deformation algorithm. For example, advanced normalization tools (ANTS) may be used to deform the first reference case 604 to resemble the first patient image 602. Various parameters of ANTS may be adjusted to control degrees of deformation of the deformation field and therefore of the first reference case 604. For example, NRR may be run for different evolution periods/number of iterations, smoothness of the field may be adjusted, and so on.

To generate a first simulated pathology image 612 having a first degree of deformation, the first reference case 604 may be deformed using a first set of parameters. For example, NRR of the first reference case 604 may be run for a first evolution period. Using the ANTS algorithm, smoothing may be controlled using symmetric normalization (SyN) and Gaussian displacement (Gauss). For example, SyN for deformation of the first reference case 604 may be 0.25 and Gauss may be [3.0, 0.5]. The deformation algorithm (e.g., ANTS) may output a first deformation field 622, which may indicate regions of deformation. As described with respect to workflow 400 of FIG. 4 and method 500 of FIG. 5, the first deformation field 622 may be applied to the first reference case 604 to deform the first reference case 604. The first simulated pathology image 612 may be generated as a result of NRR of the first reference case 604 to the first patient image 602 and application of the first deformation field 622 to the first reference case 604, such that the first simulated pathology image 612 includes a first degree of deformation (e.g., a mild scoliosis case).

A second simulated pathology image 614 may be similarly generated from NRR of the first reference case 604 to the first patient image 602. A second set of parameters may be input into the deformation algorithm (e.g., ANTS) along with the first reference case 604 and the first patient image 602. The second set of parameters may be different from the first set of parameters (e.g., used to generate the first simulated pathology image 612) and therefore may generate the second simulated pathology image 614 having a second degree of deformation which is different from the first degree of deformation of the first simulated pathology image 612. For example, NRR of the first reference case 604 may be run for a second evolution period to generate the second simulated pathology image 614, where the second evolution period may be longer than the first evolution period for which NRR of the first reference case 604 is run to generate the first simulated pathology image 612. For example, SyN may be 0.5 and Gauss may be [3.0, 0.0]. The deformation algorithm (e.g., ANTS) may output a second deformation field 624, which may indicate regions of deformation based on the second set of parameters. As described with respect to workflow 400 of FIG. 4 and method 500 of FIG. 5, the second deformation field 624 may be applied to the first reference case 604 to deform the first reference case 604. The second simulated pathology image 614 may be generated as a result of NRR of the first reference case 604 to the first patient image 602 and application of the second deformation field 624 to the first reference case 604, such that the first simulated pathology image 612 includes a second degree of deformation (e.g., a severe scoliosis case).

Using varying iterations of NRR (e.g., by adjusting parameters of the deformation algorithm) may allow for generation of a plurality of simulated pathology images from a single reference case and patient image, each of which may show a different variation of a simulated deformity. As further described with respect to FIG. 7, a deformation field output by a deformation algorithm (e.g., ANTS) may be further manipulated to change regions of and/or severity of deformation. For example, a first region of the deformation field may be manipulated to increase an amount of deformation and a second region of the deformation field may be manipulated to decrease an amount of deformation. Following manipulation, the deformation field may be applied to a reference case (e.g., the reference case used to generate the deformation field, as described with respect to FIGS. 4-6) to generate simulated pathology cases with severe or mild severity, or many varieties thereof.

Turning now to FIG. 7, an exemplary workflow 700 is shown for manipulation of a deformation field. The deformation field may be generated based on non-rigid registration (NRR) of a patient image to a reference case, as described with respect to FIGS. 5-6. The deformation field may be manipulated to change severity of deformation in regions of the deformation field and manipulation may be based on information and/or characteristics of tissue types, anatomical knowledge, user input, and so on. In this way, different deformation fields may be generated from an original deformation field which is generated based on NRR of the patient image and the reference case. When each deformation field (e.g., the original deformation field, at least one manipulated deformation field) is applied to the reference case, a simulated pathology image may be generated, wherein each simulated pathology case may include different deformations of an anatomy.

A second patient image 702 and a second reference case 704 may each be input into a deformation algorithm to perform NRR of the pathology image with the reference case. For example, the second patient image 702 and the second reference case 704 may be input into an ANTS algorithm, as described with respect to FIG. 6. The second reference case 704 may be deformed by the deformation algorithm to resemble the second patient image 702. For example, a curvature of a spine shown in the second reference case 704 may be increased, as shown in a deformed image 706. The deformed image 706 may be generating by applying an original deformation field 708 to the second reference case 704. The original deformation field 708 may be output by the deformation algorithm, as described with respect to FIGS. 5-6.

The deformed image 706 may be output for display on a display device, such as the display device 33 of the image processing system 100 FIG. 1. A user may evaluate the deformed image 706 and determine that different deformation of the second reference case 704 is desired. For example, the user may provide input to instructions of the simulation module 112 indicating that more or less deformation of the second reference case 704 is desired to generate a simulated pathology image having a greater or lesser degree of disease severity (e.g., severe or mild scoliosis), respectively. In some embodiments, instructions of the simulation module 112 may include instructions to manipulate original deformation fields (e.g., original deformation field 708) without user input. For example, if application of the original deformation field to the second reference case 704 is determined to generate a deformed image (e.g., the deformed image 706) which includes greater disease severity than may be possible in a patient, the original deformation field may be manipulated to decrease a degree of severity (e.g., decrease a degree of deformation).

The original deformation field 708 may be manipulated to generate a manipulated deformation field 710. Manipulation of the original deformation field 708 may include increasing deformation of the original deformation field 708 in a first region and decreasing deformation of the original deformation field 708 in a second region. In the embodiment shown in FIG. 7, the original deformation field 708 is manipulated to reduce severity of disease (e.g., scoliosis) and to obtain a more upright posture (e.g., compared to posture generated using the original deformation field 708). The manipulated deformation field 710 may be applied to the second reference case 704 to generate a third simulated pathology image 712, which includes desired pathology characteristics (e.g., curved spine region which may indicate scoliosis). As the manipulated deformation field 710 is applied to the second reference case 704 to generate the third simulated pathology image 712 instead of the original deformation field 708, which is generated based on NRR of the second patient image 702 and the second reference case 704, the third simulated pathology image 712 may show less severe pathology compared to the second patient image 702. In this way, severity of deformation, and therefore severity of pathology in a simulated pathology image, may be selectively adjusted by manipulating a deformation field generated based on NRR of a patient image (e.g., with pathology) and a reference case (e.g., without pathology or with comparatively mild pathology).

Following generation of a simulated pathology image, the simulated pathology image may be augmented to simulate anomalies and/or artifacts which may not be present in either of the reference case or the patient image. This may allow for generation of simulated pathology images with multiple overlapping conditions, such as organ deformation and artifact presence (e.g., metal implants). FIG. 8 shows embodiments 800 of simulated pathology images with different degrees of pathology severity which have been augmented to include metal implants. Augmentation of simulated pathology images may be performed as part of workflow 400 of FIG. 4 and/or method 500 of FIG. 5 (e.g., operation 516). However, other augmentations of the simulated pathology image to simulate presence of overlapping pathology/artifact presence may be similarly performed without departing from the scope of the present disclosure.

A fourth simulated pathology image 802 shows an embodiment of severe scoliosis in a patient (e.g., in accordance with diagnostic metrics established by medical practitioners), and may be generated by deformation of a reference case (e.g., having no pathology/no scoliosis) based on a patient image having mild scoliosis or from a simulated pathology case having mild scoliosis, according to the methods described with respect to FIGS. 4-7. In the embodiment shown in FIG. 8, the fourth simulated pathology image 802 may include a first artifact 804, which may be a metal implant, calcification, or other artifact. In embodiments of simulated pathology images other than those shown in FIG. 8, prior to augmentation, the simulated pathology image may not include artifacts. The fourth simulated pathology image 802 may be augmented by applying further deformations, such as may be indicated by an additional deformation field or user input to an augmentation algorithm, to generate an augmented fourth simulated pathology image 822. Additionally or alternatively, the fourth simulated pathology image 802 may be augmented using a machine learning model trained to obtain a realistic depiction of an anatomy based on a simulated image and captured patient images, and/or to generate multiple contrast changes. As a result, the augmented fourth simulated pathology image 822 may be generated, which includes a second artifact 806 and a third artifact 808 in addition to the first artifact 804. In combination with addition of at least one artifact, the first artifact 804 may be augmented, for example, made larger.

Similar to the fourth simulated pathology image 802, a fifth simulated pathology image 810 shows an embodiment of mild scoliosis in a patient, and may be generated by deformation of a reference case (e.g., having no pathology/no scoliosis), from deformation of a patient image having severe scoliosis, or from a simulated pathology case having severe scoliosis, according to the methods described with respect to FIGS. 4-7. In the embodiment shown in FIG. 8, the fifth simulated pathology image 810 may include a fourth artifact 812, which may be a metal implant, calcification, or other artifact which may not be included in a patient without pathology. In other embodiments, prior to augmentation, a simulated pathology image may not include artifacts. The fifth simulated pathology image 810 may be augmented by applying further deformations, such as may be indicated by an additional deformation field. Additionally or alternatively, the fourth simulated pathology image 802 may be augmented using a machine learning model (e.g., a deep learning network) trained to obtain a realistic depiction of an anatomy based on a simulated image and captured patient images, and/or to generate multiple contrast changes. As a result, an augmented fifth simulated pathology image 830 may be generated, which includes a fifth artifact 814 in addition to the fourth artifact 812. The fourth artifact 812 may or may not be augmented (e.g., made larger or smaller and/or position shifted).

In the embodiments 800 of FIG. 8, each of the first artifact 804, the second artifact 806, the third artifact 808, the fourth artifact 812, and the fifth artifact 814 may be metal implants. However, other artifacts such as calcification and/or tissue lesions may also be added to simulated pathology images using the methods described herein.

As briefly described with respect to FIGS. 4 and 5 and further described with respect to FIGS. 6-8, deformation fields and subsequent simulated pathology images may be generated using non-rigid registration of a patient image (e.g., with pathology) and a reference case (e.g., without pathology or with mild pathology, compared to the patient image). Additionally or alternatively, deformation fields and therefore simulated pathology images may be generated based on anatomy-aware deformation of a reference case. For example, anatomical knowledge, such as characteristics and parameters used to diagnose pathologies (e.g., scoliosis), may be used to generate a deformation field for a reference case. Deformation of reference cases to generate simulated pathology images based on anatomical knowledge is further described herein with respect to FIGS. 9-10.

Turning to FIG. 9, an exemplary workflow 900 for generating a simulated pathology case using anatomical knowledge to deform a reference case is shown. The exemplary workflow 900 optionally includes using an anatomy mask to identify a region to be deformed. The anatomy mask may be applied to the reference case, and the reference case and mask may be input into a deformation algorithm configured to generate anatomy-aware deformation based on anatomical knowledge also input into the deformation algorithm. The deformation algorithm may output a deformation mask, which may be applied to the reference case to generate a simulated pathology image. The simulated pathology image may include deformation of the anatomy indicated by the anatomy mask, such that the anatomy has pathology characteristics (e.g., simulated scoliosis or other organ deformation in accordance with a desired disease input).

An anatomical knowledge dataset 902 may include parameters and characteristics of an anatomy which may be used to differentiate a disease case (e.g., a pathology case) from a non-pathology case. In the embodiments described herein, the anatomical knowledge dataset 902 may include curvature information, such as a degree of curvature threshold and/or a number of curves which, when exceeded, may indicate scoliosis. Parameters and characteristics may be included for different degrees of deformation. For example, the anatomical knowledge dataset 902 may include parameters and characteristics of a spine having mild scoliosis, which may indicate that spines having mild scoliosis may twist and curve to a side (e.g., laterally away from a longitudinal axis of a patient's back). To diagnose pathologies other than scoliosis and/or to diagnose anatomies other than a spine, an anatomical knowledge dataset may include other parameters and characteristics of the anatomy which differentiate disease cases from non-pathology cases.

An anatomy mask 912 may be optionally applied to a third reference case 904 to indicate a region to be deformed. In the embodiment shown in FIG. 9, the anatomy mask 912 indicates the spine as the region to be deformed. The third reference case 904, with the anatomy mask 912 overlaid thereon, and the anatomical knowledge dataset 902 may be input into a deformation algorithm to generate anatomy-aware deformation 906. For example, the spine region (e.g., indicated by the anatomy mask 912) of the third reference case 904 may be deformed by the deformation algorithm based on the anatomical knowledge dataset 902. For example, the image data of the spine region of the third reference case 904 may be deformed (e.g., shifted, translated, distorted, and so on) to resemble known scoliosis characteristics and parameters (e.g., where the spine may twist and curve to a side, as described above). In some embodiments, the spine region may be parameterized by b-spline knot points and knot points may be moved to deform the spine region. The deformation algorithm may thus generate a third deformation field 908 which, when applied to the third reference case 904 with the anatomy mask 912 overlaid thereon, may deform the spine region accordingly. Application of the third deformation field 908 to the third reference case 904 may generate a sixth simulated pathology image 910, which shows a mild scoliosis case. As shown in the sixth simulated pathology image 910, the spine region (e.g., indicated in the third deformation field 908 by the anatomy mask 912) may be curved (e.g., concave toward a left side with respect to a center line 914 of the sixth simulated pathology image 910).

In this way, simulated pathology images may be generated for a desired anatomy by overlaying an anatomy mask on a reference case to be deformed. Further, simulated pathology images may be generated from reference cases (e.g., non-pathology medical images) without a patient image (e.g., a pathology image) and instead using anatomical knowledge of the pathology. The workflow described with respect to FIG. 9 may be implemented when patient images for a desired pathology are scarce and/or to further diversify pathologies shown in simulated pathology cases which may be used to train a machine learning model to identify pathologies in medical images.

Simulated pathology images generated using reference cases and anatomical knowledge may be further modified to produce different severities of pathology in different regions of an anatomy of interest. As briefly described with respect to FIG. 9, anatomical knowledge may include information, parameters, and characteristics for different severities of a pathology, such as scoliosis. As described with respect to FIG. 10, multiple simulated pathology images may be generated based on a single reference case by applying anatomical knowledge of different pathology severities and optionally to different regions of the anatomy of interest.

FIG. 10 shows a plurality of images 1000, including a fourth reference case 1002, a seventh simulated pathology image 1004, an eighth simulated pathology image 1006, and a ninth simulated pathology image 1008. Each of the seventh simulated pathology image 1004, the eighth simulated pathology image 1006, and the ninth simulated pathology image 1008 may be generated from the fourth reference case 1002 by applying different pathology parameters from an anatomical knowledge dataset thereto. As described with respect to FIG. 9, an anatomy mask may be overlaid on the reference case to indicate a region to be deformed. In the embodiment of FIG. 10, a spine mask 1012 may be overlaid on the fourth reference case 1002, indicating a spine region to be deformed.

Each of the seventh simulated pathology image 1004, the eighth simulated pathology image 1006, and the ninth simulated pathology image 1008 may have a different pathology location and a different level of severity. For example, the eighth simulated pathology image 1006 may show a more severe scoliosis case compared to the seventh simulated pathology image 1004 (e.g., a larger concave curve of the spine region). Additionally, the ninth simulated pathology image 1008 may show a scoliosis curve higher on the spine (e.g., proximate to a head/neck region) compared to the seventh simulated pathology image 1004 and the eighth simulated pathology image 1006. The ninth simulated pathology image 1008 further includes a convex curvature, where each of the seventh simulated pathology image 1004 and the eighth simulated pathology image 1006 include a concave curvature and a convex curvature. In this way, different pathologies may be generated and shown in simulated pathology images by deforming a reference case using different anatomical knowledge datasets.

Following generation of simulated pathology images according to the methods described with respect to FIGS. 4-10, the simulated pathology images may be used to train a machine learning model, such as a DNN to identify pathologies in medical images.

Figure 11:
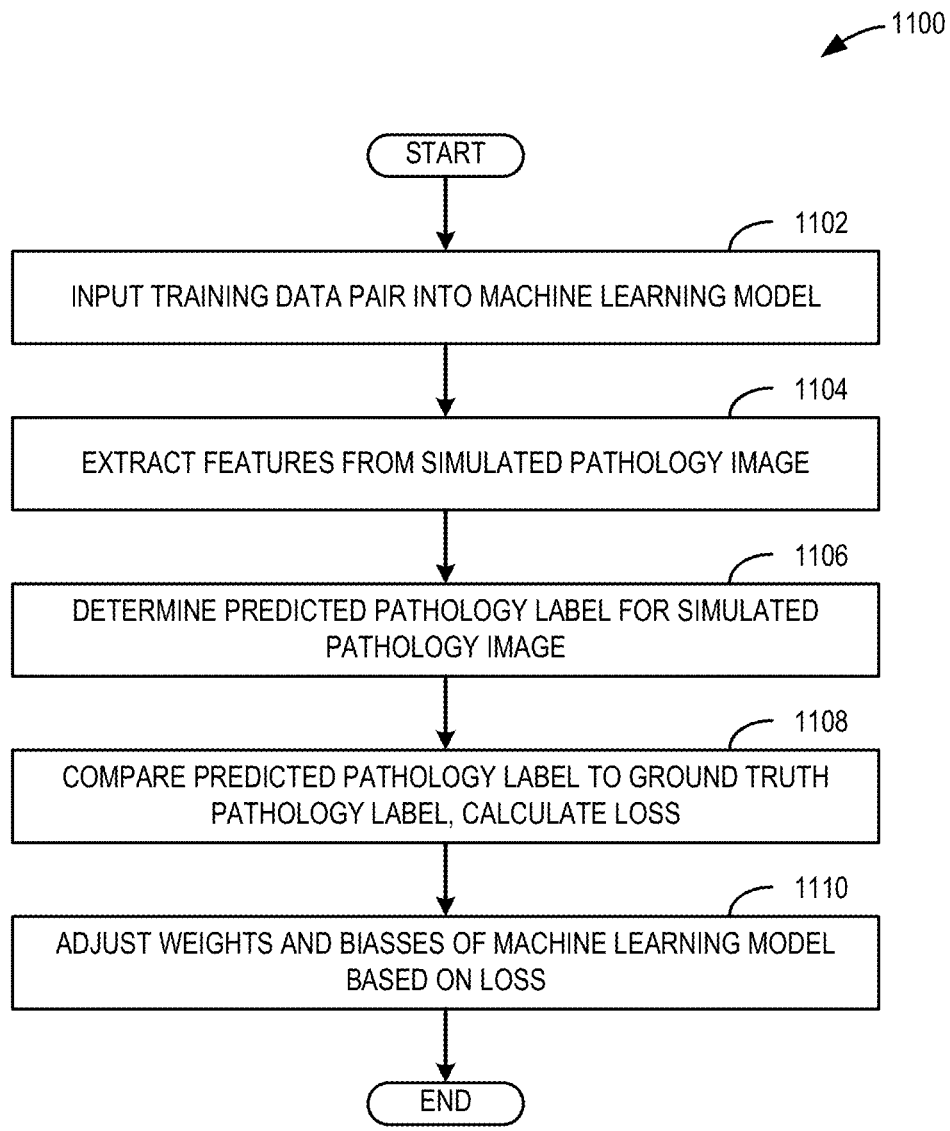
FIG. 11 is a flow chart of an exemplary method for training a deep neural network using simulated pathology images, according to an embodiment.

Turning now to FIG. 11, a flow chart is shown for a method 1100 for training a DNN to identify anatomical structures with or without deformities in medical images. The DNN described herein may be an example of a machine learning model implementing in an imaging system, such as the CT imaging system of FIG. 2, however other machine learning models may be trained and implemented according to the methods described herein without departing from the scope of the present disclosure. For example, when the DNN is used for intelligent scan plane planning, anatomical landmarks may be used to identify a region or regions to be scanned. Thus, when the DNN is trained with pathology cases as well as non-pathology cases, diagnostic accuracy of the DNN may be similar for both pathology and non-pathology cases. The DNN may be trained using a plurality of simulated pathology images, which may be generated according to the methods described above with regard to FIGS. 4-10. The DNN may be trained at a first system and implemented at a second system. For example, the method 1100 may be implemented by (e.g., the DNN may be trained by) the training module 110 of FIG. 1 which is coupled to the image processing device 31 (e.g., used to generate and store the simulated pathology images). Once trained, the DNN may be implemented by an imaging system, such as the CT system 200 of FIG. 2 and/or the imaging system 300 of FIG. 3.

As briefly described above with respect to FIG. 5, a training data pair may include a simulated pathology image and at least one corresponding pathology label, where the simulated pathology image is generated according to the methods described with respect to FIGS. 4-10. A simulated pathology image may include at least one pathology, such as organ deformation (e.g., scoliosis). In some embodiments, the simulated pathology image may include more than one pathology, such as organ deformation and anomalies/artifacts, which may include lesions, metal implants, calcification, and so on. For simulated pathology images having more than one pathologies, each pathology may be labeled such that the simulated pathology image has more than one associated pathology label. A plurality of training data pairs may be used to train a machine learning model (e.g., a DNN). Briefly, a simulated pathology image of a training data pair may be input into the untrained machine learning model. The untrained machine learning model may extract features of the simulated pathology image to identify deformities, anomalies, artifacts, and other pathologies. A label may be predicted for the simulated pathology image based on identified features, where the label includes at least one identified pathology. A loss may be determined between the predicted label and the associated label (e.g., of the training pair). Weights and biases of the untrained machine learning model may be adjusted based on the loss. This process may be repeated for a plurality of training data pairs until loss calculated is below a desirable error threshold, at which point the machine learning model may be considered to be trained and may be implemented in methods for intelligent scan plane planning or other machine learning models which use landmark information in medical images.

Method 1100 begins at operation 1102, where a training data pair from a plurality of training data pairs is input into a machine learning model, herein a DNN, wherein the training data pair comprises a simulated pathology image, including an anatomical region with at least one deformity, and at least one corresponding pathology label. In some embodiments, the training data pair, and the plurality of training data pairs, may be stored in an image processing system, such as in medical image data 114 of the image processing device 31. The DNN may be stored in a memory of a device communicatively coupled (e.g., via Internet connection to a remote server) to the image processing device, such as a device which includes the training module 110.

At operation 1104, the training module 110 may extract features from the simulated pathology image using a feature extractor. In some embodiments, the feature extractor comprises one or more learnable/adjustable parameters, and in such embodiments, said parameters may be learned by execution of method 1100. In some embodiments, the feature extractor comprises hard-coded parameters, and does not include learnable/adjustable parameters, and in such embodiments the feature extractor is not trained during execution of method 1100. In other embodiments, the training module may identify anatomies of the simulated pathology image by prescribing a segmentation mask to the simulated pathology image.

At operation 1106, the training module determines at least one predicted pathology label for the simulated pathology image using a DNN. In some embodiments, the DNN comprises a CNN, comprising one or more convolutional layers, comprising one more convolutional filters.

At operation 1108, the training module compares the at least one predicted pathology label to ground truth pathology labels (e.g., the at least one pathology label of the simulated pathology image included in the training data pair). In some embodiments, the training module calculates a loss for the predicted pathology label(s) based on a difference between the predicted pathology label(s) and the ground truth pathology label(s).

At operation 1110, the weights and biases of the machine learning model (e.g., the DNN) are adjusted based on the loss determined at operation 1108. In some embodiments, the parameters of the feature extractor, and the DNN, may be adjusted to reduce the loss over a set of training data pair. In some embodiments, the feature extractor may not include a learnable parameter, and therefore operation 1110 may not include adjusting parameters of the feature extractor. In some embodiments, back propagation of the loss may occur according to a gradient descent algorithm, wherein a gradient of the loss function (a first derivative, or approximation of the first derivative) is determined for each weight and bias of the DNN. Each weight (and bias) of the DNN is then updated by adding the negative of the product of the gradient determined (or approximated) for the weight (or bias) with a predetermined step size. Method 1100 may then end. It will be noted that method 1100 may be repeated for each of a plurality of training data pairs in a training data set, and this process may be repeated until a stop condition is met. Wherein, in some embodiments, the stop condition comprises one or more of the loss decreasing to below a threshold loss, a rate of loss change decreasing to below a threshold rate of loss change, a validation loss, determined over a validation data set, reaching a minimum, and so on. In this way, a DNN may learn to identify anatomies having pathology characteristics in medical images, which may allow for the DNN to be used in methods such as intelligent scan plane planning where anatomical landmarks are used.

In this way, a non-rigid registration-based method is provided, combined with prior-knowledge of deformity biomechanics for generating various degree of deformities from reference cases. The method includes an ability to add other patient conditions, such as metal implants, pathologies, and so on, to simulated pathology images which include deformities. Execution of the method may be accomplished on conventional compute platforms as opposed to finite element method (FEM)-based methods, which may be compute intensive. Pathology images may thus be simulated using reference cases and examples of deformity data within a reasonable compute time (e.g., 5 to 8 minutes). Additionally, simulated pathology images generated as described herein may include overlapping (e.g., more than one) patient conditions (e.g., organ deformation, implants, calcification, and so on) in a single simulated pathology image. In this way, the methods and systems provided herein may form an effective data augmentation methodology used for training machine learning models to identify such deformities as are simulated based on reference cases.

The disclosure also provides support for a method, comprising: acquiring a pathology dataset, acquiring a reference dataset, generating a deformation field by mapping points of a reference case of the reference dataset to points of a patient image of the pathology dataset, manipulating the deformation field, applying the deformation field to the reference case to generate a simulated pathology image including a simulated deformation pathology, and outputting the simulated pathology image. In a first example of the method, the pathology dataset includes a plurality of patient images, each including an anatomical region having a deformation pathology. In a second example of the method, optionally including the first example, generating the deformation field includes non-rigidly registering the reference case to the patient image. In a third example of the method, optionally including one or both of the first and second examples, generating the deformation field includes group-wise non-rigid registration of the plurality of patient images of the pathology dataset to the reference case of the reference dataset. In a fourth example of the method, optionally including one or more or each of the first through third examples, the pathology dataset is anatomical knowledge of an anatomy, including characteristics and parameters of the anatomy which differentiate the anatomy having disease pathology from the anatomy without disease pathology. In a fifth example of the method, optionally including one or more or each of the first through fourth examples, generating the deformation field includes performing anatomy-aware deformation of the reference case based on the patient image. In a sixth example of the method, optionally including one or more or each of the first through fifth examples, performing anatomy-aware deformation includes applying an anatomy mask to the reference case, where the anatomy mask indicates a region of interest to be deformed. In a seventh example of the method, optionally including one or more or each of the first through sixth examples, the reference case is an image of an anatomical region without disease pathology or an image of the anatomical region with disease pathology. In an eighth example of the method, optionally including one or more or each of the first through seventh examples, manipulation of the deformation field includes at least one of adjusting a degrees of freedom parameter of the deformation field or adjusting degrees of deformation according to tissue-type parameters. In a ninth example of the method, optionally including one or more or each of the first through eighth examples, the method further comprises: manipulating the simulated pathology image by adjusting image intensities to simulate artifacts such as metal implants, calcification, and lesions. In a tenth example of the method, optionally including one or more or each of the first through ninth examples, manipulating the simulated pathology image includes inputting the simulated pathology image into a machine learning model trained to output a realistic depiction of anatomy simulated in the simulated pathology image. In an eleventh example of the method, optionally including one or more or each of the first through tenth examples, outputting the simulated pathology image includes outputting the simulated pathology image to a memory which is communicably coupled to a training module including an untrained machine learning model and instructions for training the untrained machine learning model.

The disclosure also provides support for a method, comprising: generating a deformation field based on a pathology dataset and a reference case, manipulating the deformation field, applying the deformation field to the reference case to generate a simulated pathology image, augmenting the simulated pathology image, and outputting the simulated pathology image. In a first example of the method, the pathology dataset is a medical image of an embodiment of an anatomy with at least one anatomical deformity, or parameters and characteristics of at least one anatomical deformity of the anatomy. In a second example of the method, optionally including the first example, the reference case is an embodiment of an anatomy of the pathology dataset without anatomical deformity or with anatomical deformity. In a third example of the method, optionally including one or both of the first and second examples, manipulating the deformation field includes adjusting parameters of a deformation algorithm to adjust regions of deformation within the deformation field. In a fourth example of the method, optionally including one or more or each of the first through third examples, augmenting the simulated pathology image includes modulating intensities of the simulated pathology image due to a bio-physical tissue model.

The disclosure also provides support for an image processing system, comprising: a user input device, a display device, a memory, wherein the memory includes machine readable instructions, a training module, wherein the training module includes an untrained machine learning model, and a processor, wherein the processor is communicably coupled to the user input device, the display device, the training module, and the memory, and when executing the machine readable instructions, the processor is configured to: acquire a pathology dataset, acquire a reference dataset, generate a deformation field by mapping points of a reference case of the reference dataset to points of a patient image of the pathology dataset, manipulate the deformation field, apply the deformation field to the reference case to generate a simulated pathology image, and output the simulated pathology image to the memory. In a first example of the system, a pathology type of the simulated pathology image is labeled, and a training pair is formed of at least one pathology label coupled to the simulated pathology image. In a second example of the system, optionally including the first example when executing the machine readable instructions, the processor is further configured to: acquire a plurality of training pairs from the memory, input the simulated pathology image of the training pair into the untrained machine learning model, extract features from the simulated pathology image using the untrained machine learning model, predict at least one predicted pathology label for the simulated pathology image based on extracted features, compare the at least one predicted pathology label to the at least one pathology label coupled to the simulated pathology image and calculate loss, adjust weights and biases of the untrained machine learning model based on loss to train the untrained machine learning model, and output a machine learning model trained to identify pathologies in medical images captured by an imaging system, wherein the imaging system is communicably coupled to the training module.

As used herein, an element or step recited in the singular and preceded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the present systems and methods, including the best mode, and also to enable a person of ordinary skill in the relevant art to practice, including making and using any devices or systems and performing any incorporated methods. The patentable scope of the present disclosure is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
acquiring a pathology dataset;
acquiring a reference dataset;
generating a deformation field by mapping points of a reference case of the reference dataset to points of a patient image of the pathology dataset;
manipulating the deformation field by adjusting parameters of a deformation algorithm based on additional information including one or more of tissue elasticity parameters, prior knowledge of deformities, and deformation parameters of different tissue types to adjust regions of deformation within the deformation field;
applying the deformation field to the reference case to generate a simulated pathology image including a simulated deformation pathology; and
outputting the simulated pathology image.

2. The method of claim 1, wherein the pathology dataset includes a plurality of patient images, each including an anatomical region having a deformation pathology.

3. The method of claim 2, wherein generating the deformation field includes non-rigidly registering the reference case to the patient image.

4. The method of claim 2, wherein generating the deformation field includes group-wise non-rigid registration of the plurality of patient images of the pathology dataset to the reference case of the reference dataset.

5. The method of claim 1, wherein the pathology dataset is anatomical knowledge of an anatomy, including characteristics and parameters of the anatomy which differentiate the anatomy having disease pathology from the anatomy without disease pathology.

6. The method of claim 5, wherein generating the deformation field includes performing anatomy-aware deformation of the reference case based on the patient image.

7. The method of claim 6, wherein performing anatomy-aware deformation includes applying an anatomy mask to the reference case, where the anatomy mask indicates a region of interest to be deformed.

8. The method of claim 1, wherein the reference case is an image of an anatomical region without disease pathology or an image of the anatomical region with disease pathology.

9. The method of claim 1, wherein manipulation of the deformation field by adjusting parameters of a deformation algorithm based on the additional information includes at least one of adjusting a degrees of freedom parameter of the deformation field or adjusting degrees of deformation according to tissue-type parameters, and wherein the additional information includes tissue elasticity parameters, prior knowledge of deformities, and deformation parameters of different tissue types to adjust regions of deformation within the deformation field.

10. The method of claim 1, further comprising manipulating the simulated pathology image by adjusting image intensities to simulate artifacts such as metal implants, calcification, and lesions.

11. The method of claim 10, wherein manipulating the simulated pathology image includes inputting the simulated pathology image into a machine learning model trained to output a realistic depiction of anatomy simulated in the simulated pathology image.

12. The method of claim 1, wherein outputting the simulated pathology image includes outputting the simulated pathology image to a memory which is communicably coupled to a training module including an untrained machine learning model and instructions for training the untrained machine learning model.

13. A method, comprising:
generating a deformation field based on a pathology dataset and a reference case, wherein generating the deformation field comprises performing non-rigid registration of the reference case for a first evolution period using a deformation algorithm;
manipulating the deformation field;
applying the manipulated deformation field to the reference case to generate a simulated pathology image;
augmenting the simulated pathology image; and
outputting the simulated pathology image.

14. The method of claim 13, wherein the pathology dataset is a medical image of an embodiment of an anatomy with at least one anatomical deformity, or parameters and characteristics of at least one anatomical deformity of the anatomy.

15. The method of claim 13, wherein the reference case is an embodiment of an anatomy of the pathology dataset without anatomical deformity or with anatomical deformity.

16. The method of claim 13, wherein the deformation algorithm is an ANTS algorithm, and wherein the ANTS algorithm has a first symmetric normalization value and a first Gaussian displacement value to control smoothing.

17. The method of claim 13, wherein augmenting the simulated pathology image includes modulating intensities of the simulated pathology image due to a bio-physical tissue model.

18. An image processing system, comprising:
a user input device;
a display device;
a memory, wherein the memory includes machine readable instructions;
a training module, wherein the training module includes an untrained machine learning model; and
a processor, wherein the processor is communicably coupled to the user input device, the display device, the training module, and the memory, and when executing the machine readable instructions, the processor is configured to:
acquire a pathology dataset;
acquire a reference dataset;
generate a deformation field by mapping points of a reference case of the reference dataset to points of a patient image of the pathology dataset, wherein the deformation field comprises performing non-rigid registration of the reference case for a controlled evolution period using a deformation algorithm with smoothing parameters to control deformation;
manipulate the deformation field;
apply the deformation field to the reference case to generate a simulated pathology image; and
output the simulated pathology image to the memory.

19. The image processing system of claim 18, wherein a pathology type of the simulated pathology image is labeled, and a training pair is formed of at least one pathology label coupled to the simulated pathology image.

20. The image processing system of claim 19, wherein, when executing the machine readable instructions, the processor is further configured to:
- acquire a plurality of training pairs from the memory;
- input the simulated pathology image of the training pair into the untrained machine learning model;
- extract features from the simulated pathology image using the untrained machine learning model;
- predict at least one predicted pathology label for the simulated pathology image based on extracted features;
- compare the at least one predicted pathology label to the at least one pathology label coupled to the simulated pathology image and calculate loss;
- adjust weights and biases of the untrained machine learning model based on loss to train the untrained machine learning model; and
- output a machine learning model trained to identify pathologies in medical images captured by an imaging system, wherein the imaging system is communicably coupled to the training module.

* * * * *